US012664328B2

(12) United States Patent
French

(10) Patent No.: US 12,664,328 B2
(45) Date of Patent: Jun. 23, 2026

(54) PLATFORM FOR ARCHITECTURAL MODULARITY IN MULTIFAMILY RESIDENTIAL DESIGN AND CONSTRUCTION

(71) Applicant: Hickok Cole Architects, Inc., Washington, DC (US)

(72) Inventor: Christopher D. French, Washington, DC (US)

(73) Assignee: Hickok Cole Architects, Inc., Washington, DC (US)

( * ) Notice: Subject to any disclaimer, the term of this patent is extended or adjusted under 35 U.S.C. 154(b) by 996 days.

(21) Appl. No.: 17/316,563

(22) Filed: May 10, 2021

(65) Prior Publication Data

US 2021/0350042 A1 Nov. 11, 2021

Related U.S. Application Data

(60) Provisional application No. 63/022,919, filed on May 11, 2020.

(51) Int. Cl.
| | |
|---|---|
| *G06F 7/48* | (2006.01) |
| *G06F 30/13* | (2020.01) |
| *G06F 30/18* | (2020.01) |
| *G06F 111/20* | (2020.01) |

(52) U.S. Cl.
CPC .............. *G06F 30/13* (2020.01); *G06F 30/18* (2020.01); *G06F 2111/20* (2020.01)

(58) Field of Classification Search
CPC .............. G06F 2111/20; G06F 2113/14; G06F 2113/16; G06F 30/13; G06F 30/18
See application file for complete search history.

(56) References Cited

U.S. PATENT DOCUMENTS

| | | | |
|---|---|---|---|
| 3,831,327 | A | 8/1974 | McCrillis et al. |
| 8,417,488 | B2 | 4/2013 | Klipfel, III |
| 8,621,787 | B2 | 1/2014 | Barry et al. |
| 8,745,940 | B1 | 6/2014 | Jimenez |
| 9,695,608 | B2 | 7/2017 | French |
| 2006/0265196 | A1 | 11/2006 | Stone |
| 2008/0275673 | A1* | 11/2008 | Klipfel .................... G06F 30/13 |
| | | | 703/1 |
| 2012/0197603 | A1* | 8/2012 | Klipfel, III ............... E04H 1/04 |
| | | | 703/1 |
| 2020/0265174 | A1* | 8/2020 | Martin ................ G06F 3/04815 |

FOREIGN PATENT DOCUMENTS

| | | |
|---|---|---|
| DE | 202020101074 U1 | 4/2020 |
| JP | 10037497 A | 10/1998 |
| JP | 2002061400 A | 2/2002 |
| KR | 102149436 B1 | 4/2020 |
| WO | 2005114495 A1 | 12/2005 |
| WO | 2018165654 A1 | 9/2018 |

\* cited by examiner

*Primary Examiner* — Nithya J. Moll
(74) *Attorney, Agent, or Firm* — McGuireWoods LLP

(57) ABSTRACT

A design platform for multifamily residential building design and construction is provided that may include a series of standardized and pre-coordinated nested design frameworks for each of several different scales within a building that may be efficiently adapted to a range of different sites, building programs, and municipal regulations to improve design efficiency and quality control in site-adapted designs, and that may allow for increased incorporation of off-site fabrication and other higher efficiency construction techniques.

12 Claims, 18 Drawing Sheets

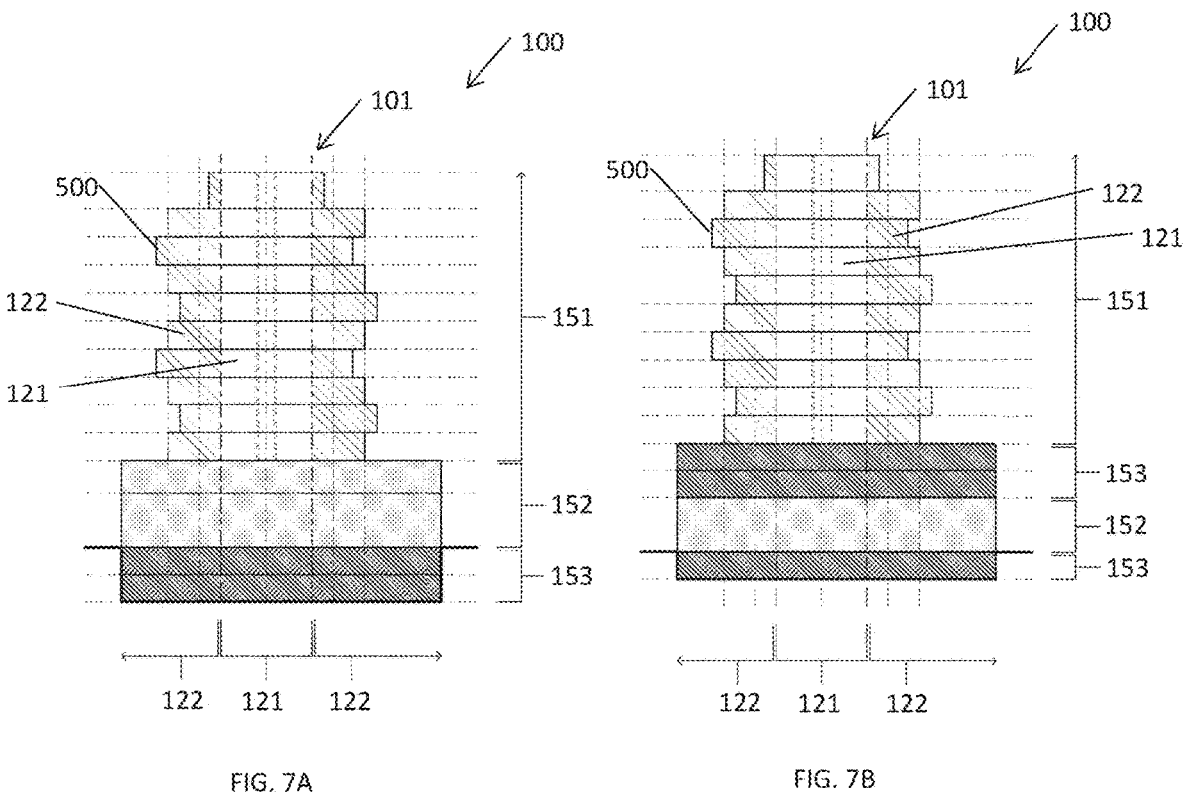
FIG. 7A                    FIG. 7B
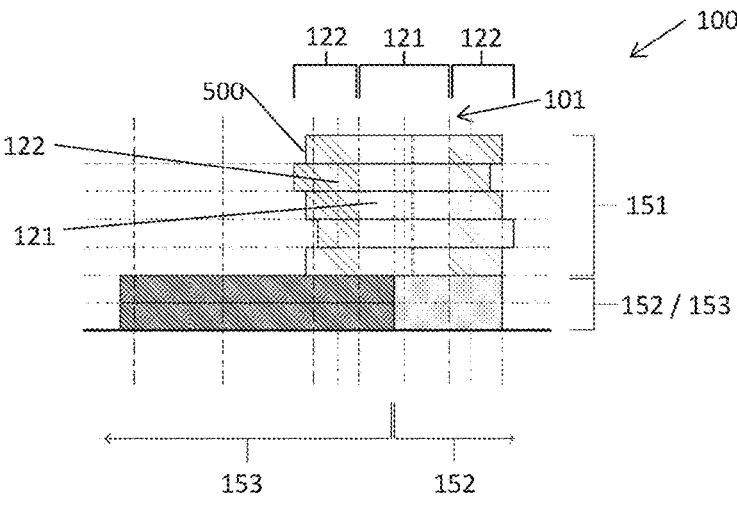
FIG. 7C 302
301
FIG. 10A
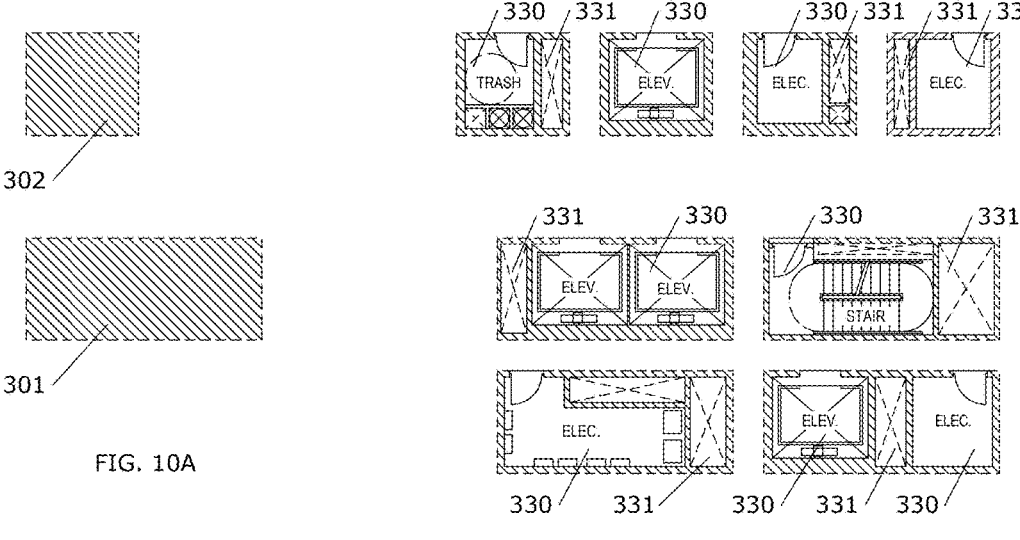
FIG. 10B
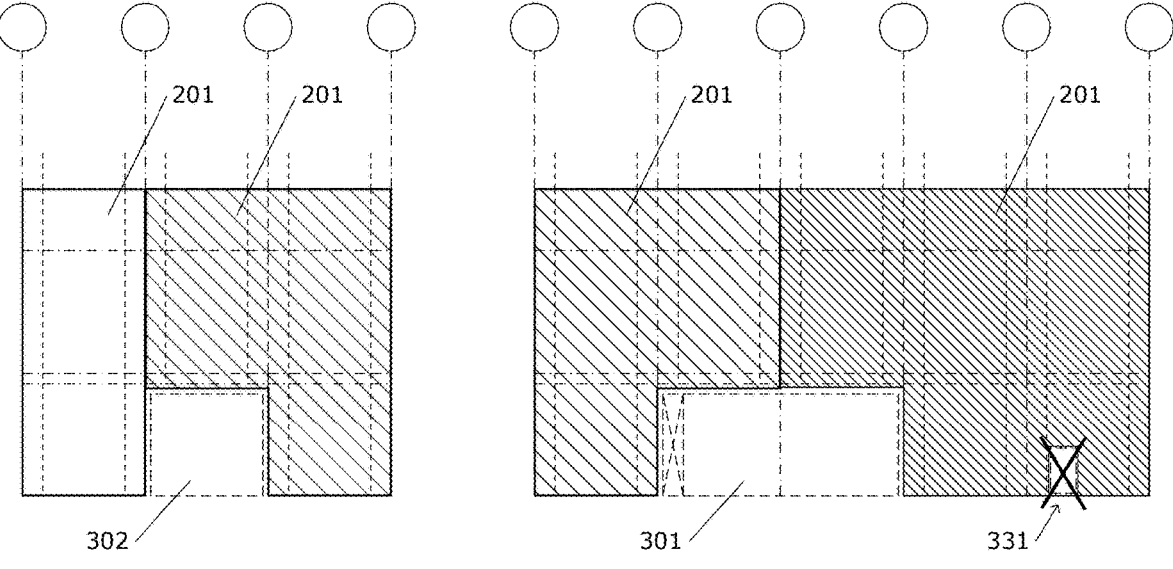
FIG. 10C

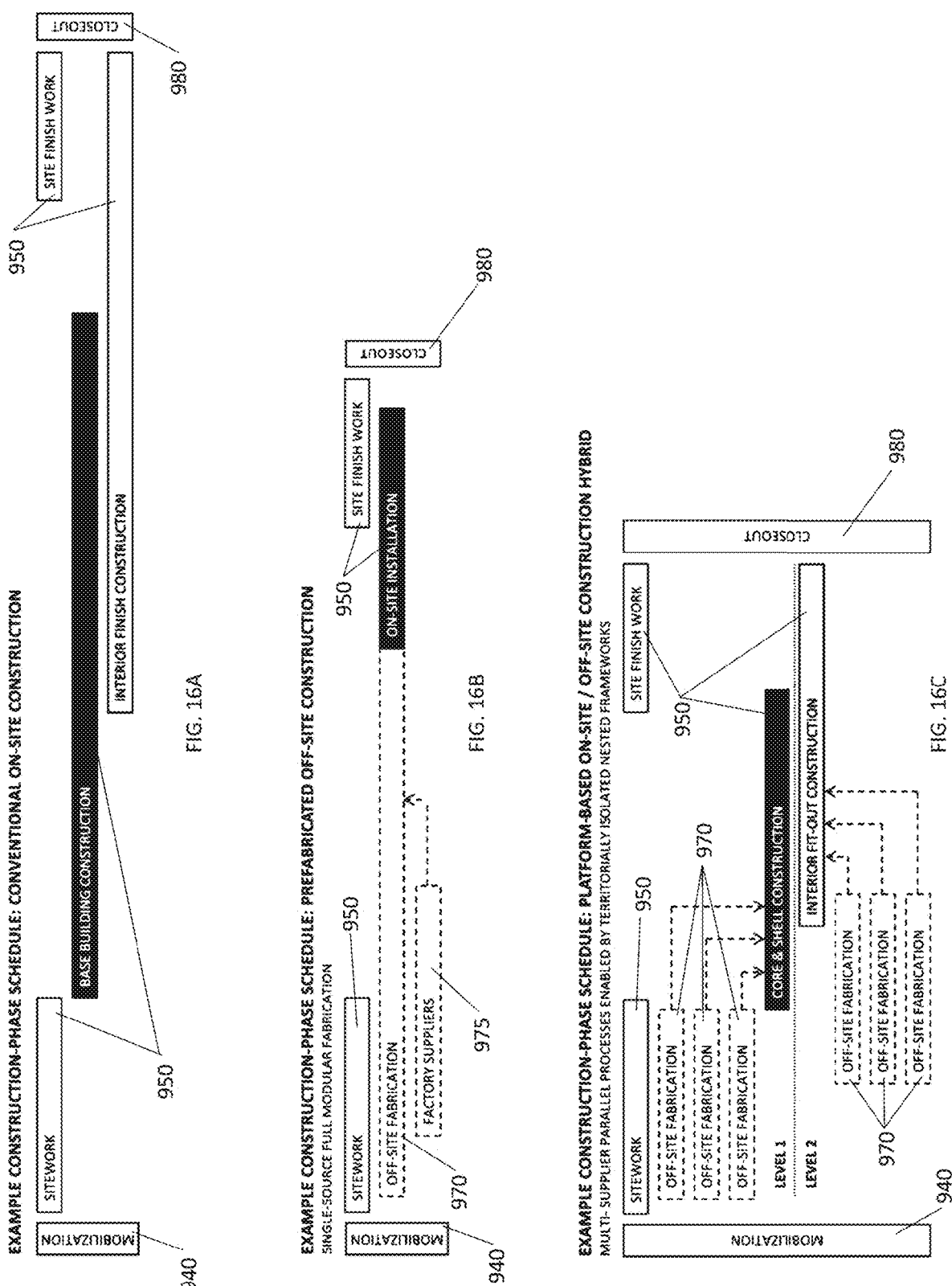

EXAMPLE CONSTRUCTION-PHASE SCHEDULE: CONVENTIONAL ON-SITE CONSTRUCTION

FIG. 16A

EXAMPLE CONSTRUCTION-PHASE SCHEDULE: PREFABRICATED OFF-SITE CONSTRUCTION
SINGLE-SOURCE FULL MODULAR FABRICATION

FIG. 16B

EXAMPLE CONSTRUCTION-PHASE SCHEDULE: PLATFORM-BASED ON-SITE / OFF-SITE CONSTRUCTION HYBRID
MULTI-SUPPLIER PARALLEL PROCESSES ENABLED BY TERRITORIALLY ISOLATED NESTED FRAMEWORKS

FIG. 16C

PLATFORM FOR ARCHITECTURAL MODULARITY IN MULTIFAMILY RESIDENTIAL DESIGN AND CONSTRUCTION

BACKGROUND OF THE DISCLOSURE

1.0 Field of the Disclosure

The disclosure is directed generally to a method and system of designing new-construction multifamily residential buildings that permits faster, higher quality design and construction and for increased potential for easier off-site fabrication of building parts, among other things.

2.0 Related Art

Buildings, and multifamily residential buildings in particular, are typically highly inefficient in design and construction. According to a recent report by the McKinsey Global Institute, "In the United States, labor productivity in construction has declined since 1968, in contrast to rising productivity in other sectors." ("Reinventing Construction: A Route to Higher Productivity," February 2017, p. 23.) Design of multifamily buildings typically occurs in one of two ways:

In one aspect, residential units are "stacked" ("first method"), with each unit type located in vertical "tiers" of identical units one above the other. This allows for greater structural and services distribution efficiency (and therefore greater design efficiency) and is the logical method for most full-modular residential construction approaches. But the stacked-units approach also results in boxy buildings that are less flexible in application and often not possible to fit into complex urban sites, which can be complicated by irregular lot shape, more complex project program requirements, municipal regulations such as zoning setbacks, etc.

In another aspect, residential units are "mapped" ("second method") to the building floor plates, distributed throughout the building to achieve a desired mix of unit variety and/or a varied building form. This allows for greater market efficiency, which is the ability to meet specific client demands while optimizing the dimensions and form of a building in the context of site and zoning restrictions. But, while solving the problem of complex programs and sites, the design process is typically messy, a result of a process in which building massing is designed first, to solve site geometry and zoning requirements, then the units are distributed on each floor according to the project's programmatic and market goals, and then structure and building services are worked in to coordinate with the varying residential unit distribution on each floor after. In the second method, vertical structural elements such as columns are often irregularly located and shift around ("transfer") from floor to floor, and vertical services elements such as plumbing risers or exhaust shafts transfer locations from one floor to the next to match the changing unit floor plans. The result is an entangled, inefficient process that requires high levels of coordination effort throughout design and construction, results in high levels of design and construction conflicts, and impedes the potential to incorporate off-site fabrication and other construction efficiencies at scale, due to the absence of design standardization within and across projects.

For the purposes of this disclosure, we will refer to the first method (stacked units) as "inside-out" design and to the second method (mapped units) as "outside-in" design. The innovation in this disclosure addresses both the inflexibility of inside-out design and the inefficiency of outside-in design. Neither "inside-out" nor "outside-in" are inherently negative terms. Both approaches have evolved over time to address specific challenges in the market, and each has its own advantages and drawbacks. "Inside-out" prioritizes efficiency, at the expense of project-specific adaptability. "Outside-in" prioritizes project-specific adaptability, at the expense of efficiency.

BRIEF DESCRIPTION OF THE DRAWINGS

The accompanying drawings, which are included to provide a further understanding of the disclosure, are incorporated in and constitute a part of this specification, illustrate examples of the disclosure and together with the detailed description serve to explain the principles of the disclosure. No attempt is made to show structural details of the disclosure in more detail than may be necessary for a fundamental understanding of the disclosure and the various ways in which it may be practiced.

FIGS. 7A-7C are illustrations that illustrate a sample range of potential building sections showing potential mixes of uses such as residential, commercial/amenity, and parking, and respecting zones of standardization and taking advantage of zones of adaptability built into the platform, according to principles of the disclosure;

FIGS. 10A-10C are illustrations illustrating a technique of maintaining a consistent relationship between Level 1A core and shell components and Level 2A residential unit design frameworks, according to principles of the disclosure;

FIGS. 16A-16C are schedule diagrams indicating differences between a conventional multifamily residential construction schedule of FIGS. 16A and 16B and an example platform-based multifamily residential construction schedule of FIG. 16C, according to principles of the disclosure.

DETAILED DESCRIPTION OF THE DISCLOSURE

Figure 1:
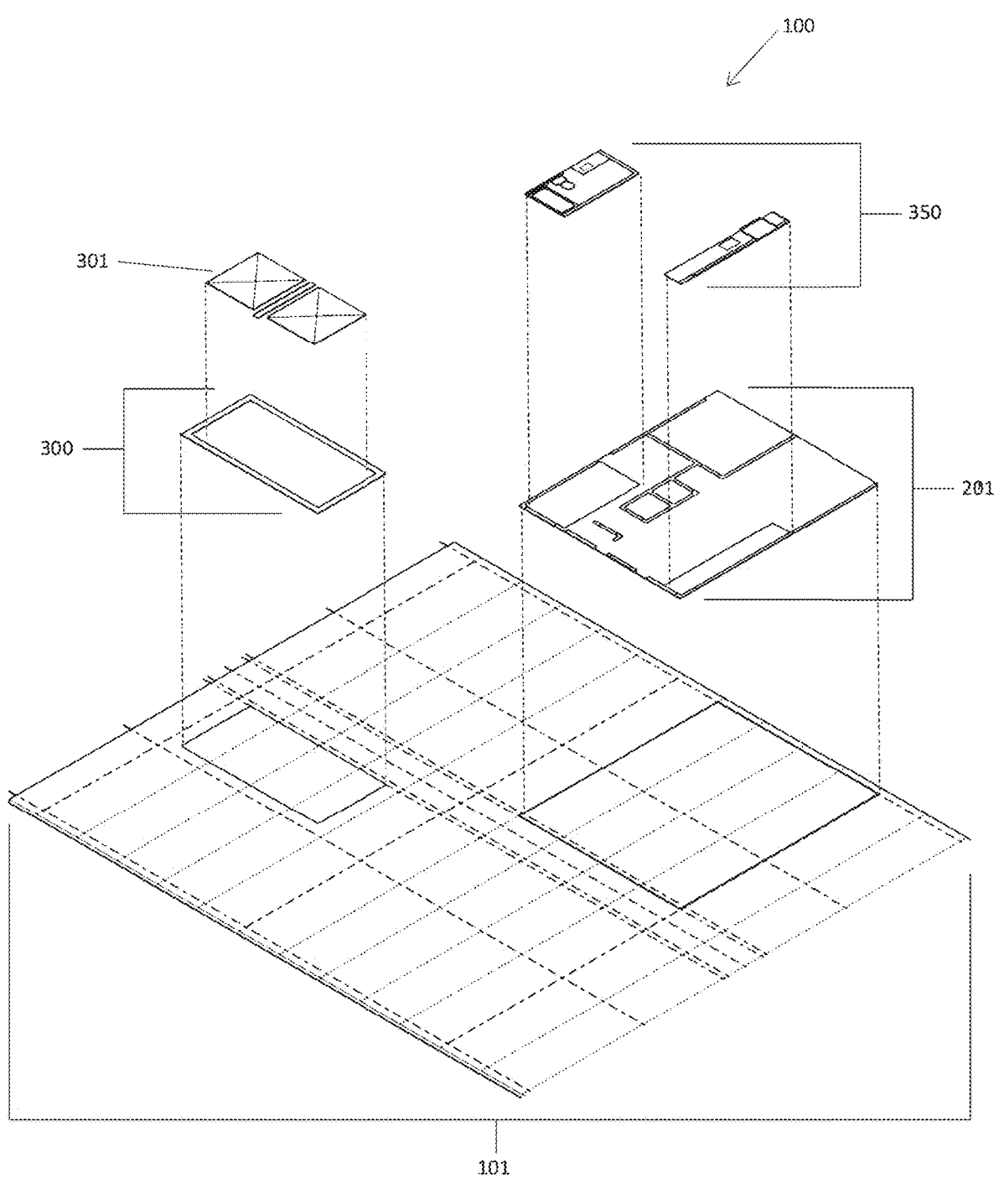
FIG. 1 is an exploded diagrammatic isometric view indicating the main levels and sub-levels of the platform and their "nested" relationships, according to principles of the disclosure.

The examples of the disclosure and the various features and advantageous details thereof are explained more fully with reference to the non-limiting examples that are described and/or illustrated in the accompanying drawings, and detailed in the following description. It should be noted that the features illustrated in the drawings are not necessarily drawn to scale, and features of one embodiment may be employed with other embodiments as anyone skilled in the art would recognize, even if not explicitly stated herein. Descriptions of well-known components and processing techniques may be omitted so as to not unnecessarily obscure the embodiments of the disclosure. Accordingly, the examples herein should not be construed as limiting the scope of the disclosure. Moreover, it is noted that like reference numerals represent similar parts throughout the several views of the drawings. Noted dimensions described herein are exemplary.

The terms "a", "an", and "the", as used in this disclosure, means "one or more", unless expressly specified otherwise. The term "multifamily residential building" used herein may include a range of uses. For example, uses may include apartments, condominiums, residential co-operatives, co-living, live/work, hotels, and motels, and may also encompass other building uses such as for example commercial, amenity, retail, and/or parking uses.

The principles of the disclosure address the significant gap in the middle by providing a process that brings and improves on the efficiencies of the "inside-out" method to meet the complex market challenges that the "outside-in" method has evolved to address. The innovation aims to provide both efficiency and adaptability to help solve some of the multifamily design and construction industry's most intractable challenges.

For the purposes of this disclosure, a distinction is made between the terms "modular" and "modularity." "Modular" in this case refers to prefabricated building parts that are composed of walls, ceilings, and floors and enclose space, such as for example modular pod bathrooms or fully-prefabricated modular residential units. In the possible range of off-site fabrication methods, modular construction is typically the most complete. Common off-site fabrication methods include, in order from typically most complete to typically least complete, "full modular," "pod modular", "closed-wall panelized," "prefabricated assemblies" such as plumbing or electrical distribution assemblies, "open-wall panelized," and "pre-cut." "Modularity" as used in this disclosure refers to dimensional standards with consistent, repeating patterns such as for example design planning grids that allow for consistent application of design elements within a building or system of building parts. Modularity does not in itself refer to prefabrication of any building parts, but may make it easier or, further, encourage the incorporation of prefabrication of building parts across the full range of off-site fabrication methods. References in this disclosure to elements within any of the described "levels" in the platform, such as "residential unit design frameworks" or room-sized "components" are not intended to imply prefabrication but are instead used as dimensional or scale references for elements that may or may not be, or be composed of, off-site fabricated parts.

For the purposes of this disclosure, a design "platform" is defined distinct from the design of individual projects. A platform is a pre-designed set of design solutions that can be applied to many different projects to improve design quality and speed, rather than designing each individual from scratch as is the current industry practice. The innovation described in this disclosure employs a platform approach somewhat analogous to a platform approach employed by auto manufacturers. In a vehicle platform, the most complex and expensive portions of the vehicle are pre-designed in a way that is both efficient to build and adaptable to meet a wide range of solutions. A single platform may provide common structure, drivetrain options, and HVAC, power, and data distribution and yet still be adaptable enough to support a wide range of vehicle designs, functions, and markets. Rather than design each individual vehicle from scratch, which would result in vehicles that are either unaffordable or under-performing, each vehicle designed and built by all but the most boutique automakers today begins with a pre-designed platform that provides pre-engineered solutions for propulsion, entertainment, and safety. Together, the systems and methods described herein provide a similar specific platform for the design and construction of a variety of possible buildings meeting a wide range of performance and market priorities, without the need to design each individual building from scratch as is the current practice.

The innovation is a design platform that provides standardization for the most complex parts of multifamily design and construction, while maximizing the flexibility of the system's applications to different site conditions and client programs. Since all building programs and sites are different, this approach may help solve one of the most intractable challenges of off-site construction, which is that modular and other prefabricated construction types are too inflexible to provide market-optimized solutions for real-world program needs on unique sites. The platform accomplishes this through the use of a series of nested design frameworks at different scales of construction. For the purposes of this disclosure, these scales will be referred to as "Levels," as follows: Level 1, a universal planning grid with dimensional standards and locational rules for major and minor parts of the building; 1A, building core and shell components; Level 2A, residential unit infill; Level 1B, core and shell vertical infrastructure for building structures and services; and Level 2B, residential unit assembly or room-sized component infill. Within each of these levels is a dimensional standard appropriate to the scale of construction and coordinated with levels above and below. References within this disclosure to Levels 1C and 2C refer to project-specific-designed building core and shell and residential infill parts, respectively, that are accommodated by the platform.

The platform is optimized for multifamily residential projects and residential-based mixed-use projects, but it is not based on or tied to a specific structural system type. Structural systems employed in the use of the design platform may include concrete framing, light wood framing, structural steel framing, light-gauge steel framing, mass timber framing, and other framing types, and any combination of structural systems. Likewise, the design platform is not based on or tied to any specific plumbing or HVAC systems or strategies, but rather is designed to accommodate in pre-determined building locations a wide range of mechanical, electrical, plumbing, communications, and fire safety systems.

The platform is organized by a universal planning grid that pre-coordinates all vertical elements of a building, including structural columns and other structural elements, plumbing risers, supply and exhaust shafts, vertical circulation cores, electrical rooms and risers, and trash/recycling rooms and shafts. Flexibility is provided through the use of built-in "zones of standardization" and "zones of adaptability" calibrated to each level of the system.

Within each level of the system, standardized design solutions for specific building parts may be pre-designed and pre-engineered as part of the design platform, prior to application on individual projects at individual sites, and then be available to project design teams when the platform is applied to meet site and program constraints and opportunities for each individual project. In this way, much of a building's design may be completed by applying the platform to the site and program requirements, which is in contrast to the current practice of designing each individual project and part of a project from scratch.

Systems and methods are described herein for designing buildings, such as new residential multifamily buildings, that allow for cost-effective site adaptability and increased potential for off-site fabrication. The systems and methods described herein provide a more rigorous design methodology that is an improvement over both the "outside-in" and "inside-out" design methods, as defined in the Background of the Disclosure. As such, the systems and methods described herein may provide the ability to design and, as a direct result, construct buildings that are faster to design and build, are less expensive to fabricate and build, have lower rates of design conflicts, are higher quality, and as a result, buildings designed according to the principles of this disclosure may have a greater ability to meet both production and market efficiency goals. The systems and methods described herein also may provide for the design and construction of buildings that are easier to maintain, modify, and update over time. Further, the systems and methods described herein provide a built-in innovation engine, in which innovations may be both accelerated and captured at higher rates than conventional design processes that neither the outside-in nor inside-out design methods currently allow.

Due to rising labor costs, shortages in available labor, and an aging labor force, the market is demanding improvements in construction efficiency. This includes an increase in demand for off-site fabrication as well as for improvements in the efficiency of on-site construction and installation. Under the current stacked-unit inside-out methodology, incorporation of full-modular construction may be facilitated. However, there are significant drawbacks to full-modular construction, particularly in urban areas, including inflexibility, shipping inefficiencies (modules are primarily empty boxes of air), and duplication of expensive structural elements at floors, ceilings, and module walls—essentially all six sides of the box include redundant structure. Under the current mapped-unit outside-in methodology, each building is designed almost completely from scratch, which results in widely varying design solutions that make consistent and cost-effective off-site fabrication prohibitively difficult. There is little to no uptake of off-site fabrication at any scale larger than off-the shelf products in the outside-in design market, which is typically more urban and makes up a significant portion of the multifamily residential construction market.

In one aspect, the core of this innovation is an innovative unifying design platform, provided as a foundation for the design and construction processes, and made up of 6 integral and interdependent elements. These integral elements may include (1) disentangling, re-prioritization, and re-organization of the parts of the building into four or more distinct Levels, or scales of building parts, with each smaller-scale Level nested into the larger-scale Level above, and a clear distinction within the platform as to the relationships between each Level; (2) coordinated dimensional planning standards for each of the four or more Levels, along with rules for relationships between grids at adjacent levels and coordinated by a universal planning grid; (3) identification and codification of "zones of standardization" and "zones of adaptability" within each level—placing the most design— and cost-intensive parts of the building in the more standardized zones of standardization while maintaining the ability for the platform to be adapted to a nearly infinite range of building sizes and forms to meet specific site constraints and program requirements; (4) specific rules and guidelines regarding the interface between adjacent Levels, and in particular maintaining a distinction throughout the design process between "Core and Shell" (1, 1A, 1B, and 1C) Levels and "Infill" (2A, 2B, and 2C) Levels; (5) an organizational system and method for developing a design catalog made up of adaptable building elements in all levels, including, at Level 1 core and shell, standardized predetermined locations for structural and MEP services serving the Shell and Infill Levels, at Level 1A, core and shell components, at Level 1B, core and shell vertical services distribution, at Level 2A, residential unit type design frameworks, and at Level 2B, residential unit component design frameworks; and (6) a method of continual improvement of the platform itself through the incorporation of built-in feedback loops to capture project-specific innovations and lessons learned so that they may be added to the foundational platform to allow future projects using the platform to benefit from previous lessons learned. Application of the above elements may constitute steps of the overall process. Further detail on each individual integral element follows.

The disentangling and organization of the building into distinct Levels (integral element 1) is primarily a distinction between the "Core and Shell" Level and the "Infill" Level, and can be further broken down as follows: Level 1: the building volume scale, guided by a universal planning grid, Level 1A, the building core and shell components scale, including stair shafts, elevator shafts, trash room stacks, and electrical/data rooms; Level 2A; the residential units scale infill; Level 1B; the core and shell scale vertical infrastructure, including structural elements and mechanical, electrical and plumbing (MEP) services distribution; and level 2B; the residential component-scale infill, such as kitchens, bathrooms, laundry closets, and HVAC closets; and further, that the innovation may establish a framework for the future design of small-scale building elements and construction details at Levels 1C and 2C, shell and infill construction respectively, each with their own zones of standardization and zones of adaptability as defined in integral element 3 below.

The provision of pre-coordinated dimensional planning standards ("design frameworks"—integral element 2) at each Level, coordinated by a universal planning grid, to allow for the nesting of smaller-scale design frameworks within the next larger scale design framework, and so on, is further defined as follows: Level 2A residential unit design frameworks and Level 1A core and shell component design frameworks nest directly into the universal planning grid. Smaller-scale Level 2B residential component design frameworks (kitchens, bathrooms, laundry/HVAC rooms and other residential unit components) nest into the Level 2A residential unit design frameworks and also into the Level 1 universal planning grid. Smaller-scale Level 1B core and shell infrastructure nests into the universal planning grid (in the case of structural elements) and into the Level 1A core and shell components (in the case of MEP infrastructure). The universal planning grid is considered "universal" in two aspects: First, it has been designed to pre-coordinate different functions on different floors of the building, for example accommodating residential uses on upper floors, amenity/office/retail uses on intermediate floors, and parking on lower floors, all using the same underlying organizational planning grid. And second, it has been designed to be used universally, across a wide range of project sizes and geometries.

The zones of standardization and zones of adaptability (integral element 3) are provided within each of the nested design frameworks (integral element 2) at each Level. Zones of standardization are determined within each Level, appropriate to the scale and function of the building parts designed at each Level, as follows: Level 1. Zones of adaptability are determined by the needs of each Level, but are accommodated by adaptability provided within each higher Level in the hierarchy. In this manner, decisions may be independently made at each Level in a building without causing negative repercussions on Levels above or below.

The rules guiding interfaces among design frameworks at different Levels, and in particular maintaining a distinction throughout the design process between "Core and Shell" (1, 1A, 1B, and 1C) Levels and "Infill" (2A, 2B, and 2C) Levels (integral element 4) for example may include (a) a Level 1 universal planning grid, which may pre-coordinate the relationships between Level 1A core and shell-level components (which may include stair shafts, elevator shafts, electrical and IT rooms, trash rooms/shafts, and others), and Level 2A residential unit infill-level unit configurations, such that design decisions or modifications at the shell components level do not interfere with design decisions or modifications at the residential unit infill level, and vice-versa, and/or (b) that major Level 1A core components may be sized to accommodate major HVAC duct risers and plumbing risers before the specific size and location requirements for the risers are determined and which risers might otherwise be located in ways that interfere with the Level 2A residential unit design frameworks, providing capacity to meet current and future building systems needs while maintaining the integrity and independence of the design and mapping of residential units throughout a building designed using the platform.

An organizational system and method for developing a design catalog (element 5) may facilitate the design development of adaptable building part designs or design frameworks in the three or more building-scale Levels. Catalog parts may be designed, categorized, and optimized for code and program compliance, and pre-coordinated with a Level 1 universal planning grid. Where appropriate, catalog parts may be pre-engineered by engineering consultants and/or design-build subcontractors such that the catalog may include architectural and engineering design specifications ready for application to individual projects on a project-by-project basis.

Design efficiency drives construction efficiency, and not the other way around. Without design efficiency, construction contractors cannot consistently achieve construction efficiency gains. Off-site fabrication of building parts, and the associated benefits, cannot be effectively achieved due to the variations in designs and specifications among all of the projects that construction contractors have the opportunity to build, and as the industry is currently practiced, construction contractors do not have the ability to make adjustments to building designs or specifications in order to incorporate the contractors' efficiency standards. The platform-based approach made possible by the systems and methods described herein allows for feedback loops (integral element 6) for innovation acceleration in four distinct ways. The first is through the disentanglement and standardization of the various elements of a building, which allows each element to be independently isolated and innovated upon without negatively impacting other elements of a building. The second is through the use of design frameworks, which provide a consistent organization of the systems, assemblies, components, and elements across buildings, thus justifying the investment in innovations that may be applied across a wide range of buildings rather than just an individual project. The third is enabled by a re-allocation of design time. Since designers on individual projects don't need to allocate time to re-inventing each project from scratch, they may focus more of their attention on solving project-specific challenges and/or contributing to improvements to the platform itself—the design catalog or underlying design frameworks. The fourth is enabled by the separation of the underlying design platform from the individual building designs, which allows the underlying platform to be continually improved by innovations and lessons learned from individual projects. In this manner, an innovation in one project may result in an update to the underlying platform, which may then propagate that innovation to future projects in a self-reinforcing cycle.

Feedback loops of this nature are not typically available to either the conventional "inside-out" or "outside-in" design methods. In the case of stacked-unit inside-out design methods, the solutions typically lack two critical aspects for innovation: lack of sufficient variation, the presence of which drives solution generation; and the lack of disentanglement and prioritization of the various building elements, which is not required if the design process is at the scale of identical or nearly-identical large sections of a building as is the case in most projects designed using an inside-out approach. In the case of mapped-unit outside-in design methods, since each outside-in project is typically designed from scratch to meet specific market requirements and site constraints, the result is project designs that vary in small but consequential ways from all other similarly-designed projects, at every scale within the project. Even slight variations within projects and from one project to another reduce the potential for standardization and design rigor, which in turn reduces the ability for project designers to consistently recapture lessons learned on one project for application to future projects. Innovations in outside-in projects tend to live on only in the minds of individual designers associated with the specific projects, and are rarely institutionalized for organizational or industry benefit, since there is no standard design framework or platform with which to associate and catalog the innovation.

In practice, use of the platform-based design system described in this disclosure may allow for new and more efficient methods in design and construction processes. Conventional design practice in the "outside-in" and "inside-out" methods described in this disclosure are typically linear processes, proceeding through industry-standard phases in what's known as a "design funnel," in which a wide range of possible solutions is narrowed down beginning at the largest scale of decision-making and proceeding through smaller and smaller scales until the project design is complete to a degree that can be effectively communicated to construction professionals. The primary difference between the "outside-in" design method and the "inside-out" design method is that, rather than beginning each project completely from scratch, the "inside-out" method begins with a catalog of standard unit types, which are typically "stacked" in a building's design, with design variations possible at special conditions in a building. The project then proceeds in a linear "design funnel" fashion through the same industry-standard steps used in the "outside-in" design method. In this way, the "inside-out" design method may result in a more efficient use of design time and effort, but may not be able to solve many complex site and program design requirements that can be solved with the "outside-in" method.

In contrast to current conventional design methods, rigorous practice of the platform-based design method in this innovation may result in "parallel processing" of design activities rather than the conventional linear "design funnel." Parallel processing, the ability for multiple design tasks to be completed independently of other tasks, may be enhanced by isolating tasks at one level from tasks at another, thus allowing design and redesign at one level to proceed without requiring additional coordination or redesign at another level. Rigorous practice of isolation between levels requires maintaining clear definition between the various levels of the platform. Examples of this isolation may include ensuring that Level 1b core and shell components such as major air shafts are located within zones of the building allocated for Level 1A functions, and that those components can never be located in zones of the building allocated for Level 2A residential unit design frameworks. Parallel processing, combined with a platform-based design catalog of adaptable building element designs at each level, each with their own zones of standardization and zones of adaptability and each pre-coordinated with building systems, may allow project teams to significantly reduce design phase durations while maintaining or improving design quality over time and iteration.

Platform-enabled parallel processing may enable similar schedule reductions and quality improvements during construction. While building designers don't control the means and methods of construction, construction methods follow design. If a design is complicated and entangled, as in the typical "outside-in" design method, then construction phasing is limited to a primarily linear on-site process. Some efforts may be applied, such as wall panelization, but those options are restricted by the design and the overall positive effects on construction duration and quality are limited. If a design is rigorously standardized, as is sometimes the case using the "inside-out" design method, options for off-site fabrication may be considered. Projects designed using the "inside-out" method are typically standardized at the scale of the whole residential unit, which may limit the range of potential off-site fabrication to unit-scale full-modular fabrication. Potential benefits of full-modular construction include increased quality control and the ability to perform the work while other work, such as site preparation and building foundations, is underway, while potential drawbacks include increased cost and increased shipping costs and complexity, due to size of the modules and the fact that most of the volume of the product shipped is air. Full-modular fabrication is typically a remotely-located linear construction process in which all of the construction activities in the off-site portion of the work are performed at a single location, transferring the on-site work normally performed on a jobsite to a sheltered environment, and as a result the schedule savings are limited to the amount of overlap between on-site and off-site construction activities. Schedule savings may be further constrained due to the common requirement, in full modular construction, for owners and other decision makers need to commit to decisions and pay for building components much earlier in the process than is required for conventional on-site construction methods. This is often necessary to meet longer lead times, and results in further project inflexibility once module designs go into engineering for production.

Construction efficiency follows design efficiency, and the platform-based design method described in this disclosure may provide a framework for new construction delivery methods. In contrast to current conventional on-site and modular construction methods, the rigorous application of the principles of this disclosure may allow for parallel construction processes performed by multiple off-site fabricators, each with their own expertise at a specific level of the building. Rather than bring together all of the off-site-fabricated building elements into a single pre-assembly facility for delivery to a site, prefabrication at different scales of a building may be provided by a range of different vendors and installed on site according to the design platform, at pre-determined times in the construction schedule. By optimizing the scale of off-site-fabricated components to the level of construction, shipping costs may be reduced and logistics simplified, while reducing on-site requirements for staging of all of the individual materials required for construction.

With respect to the drawings, the platforms 100 in FIGS. 1 through 14 are all examples of a common platform that can provide for different building configurations depending on specific project applications.

FIG. 1 is a diagrammatic isometric view indicating the main levels of the platform and their "nested" relationships. The example design platform 100 comprises a nested design framework of "levels" at different scales within a building, as follows: a Level 1 universal planning grid 101; example Level 1A core and shell components 300; an example Level 2A residential unit design framework 201; an example Level 1B core and shell infrastructure design framework 301; and an example Level 2B residential component design framework 350. This figure illustrates in general terms the method of "nesting" smaller-scale design frameworks into larger-scale design frameworks, and nesting design frameworks of all scales into a Level 1 universal planning grid. A key attribute of the innovation described in this disclosure is that the example design platforms 100 in each of the following figures can have different shapes to accomplish various site and program requirements.

Figure 2:
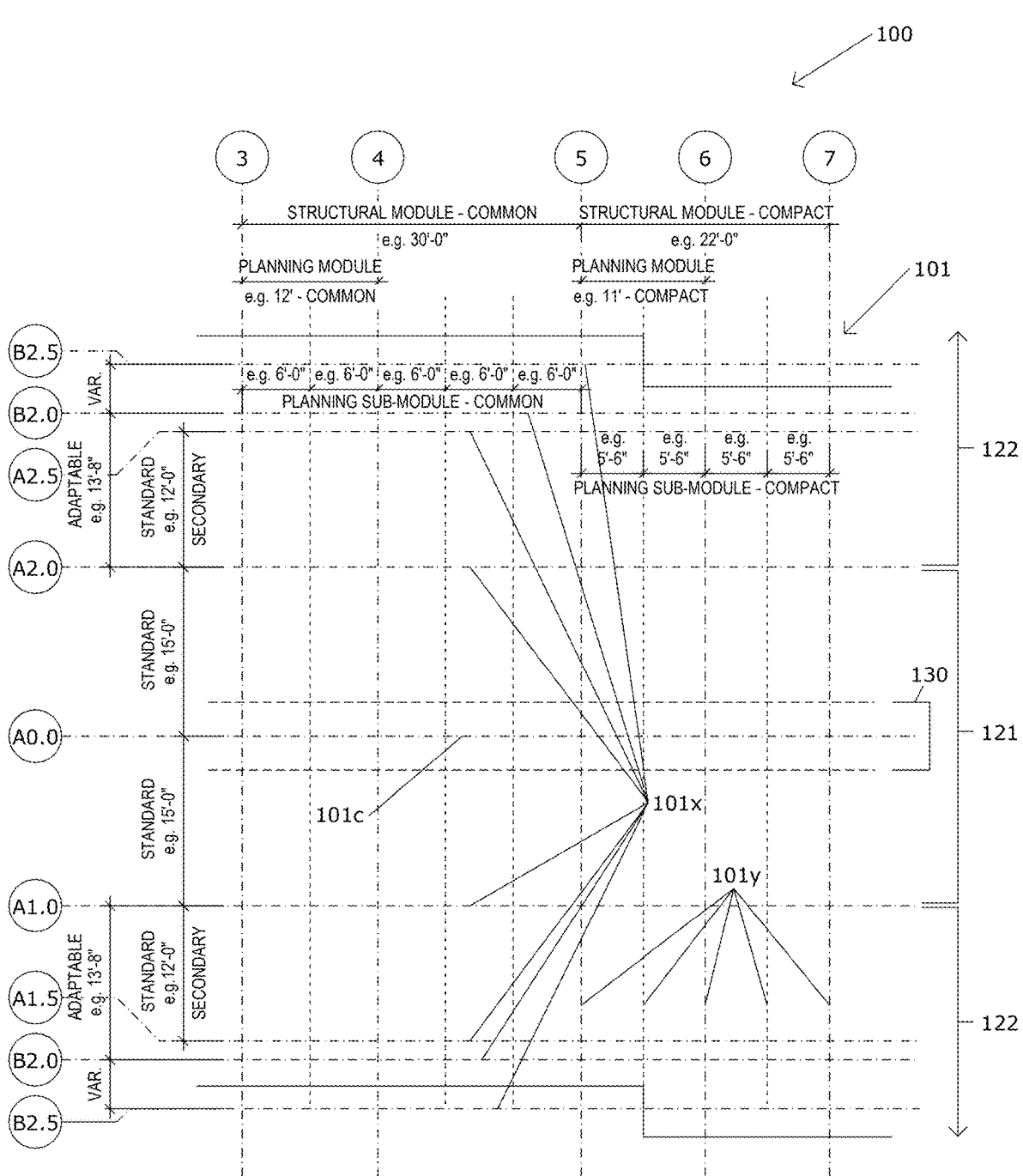
FIG. 2 is a dimensioned plan of the universal planning grid, indicating "common" and "compact" planning modules, according to principles of the disclosure.

FIG. 2 is a dimensioned plan of the universal planning grid 101, indicating "common" and "compact" planning modules. A residential services core 130 is centered on a corridor centerline 101$c$. Grid lines 101$x$, parallel to the corridor centerline 101$c$, delineate the zones of standardization 121 and zones of adaptability 122 for the core and shell Level of the building. Parallel grid lines 101$x$ are symmetrical about the corridor centerline 101$c$, with a first standardized parallel grid line 101$x$ that may be located 15' (or metric equivalent) from the corridor centerline 101$c$ on each side to establish the core and shell Level zone of standardization; an optional second standardized parallel grid line 101$x$ that may be located for example 27' (or metric equivalent) from the corridor centerline 101$c$ on each side to locate secondary MEP services locations; and, in structural types with columns or posts at the exterior walls, a third or more adaptable parallel grid line 101$x$ that may be located anywhere beyond the first standardized parallel grid line 101$x$ on each side of the corridor centerline 101$c$ to locate key structural elements. The adaptable parallel grid lines 101$x$ that are located in the planning grid's zones of adaptability need not be symmetrical about the corridor centerline 101$c$. Grid lines 101$y$, perpendicular to the corridor centerline 101$c$, establish the planning modules for locating elements along the length of the building. "Common" planning module dimensions may be for example based on a 12' grid line bay spacing (or metric equivalent), while compact planning module dimensions may be based for example on an 11' grid line bay spacing. In the case of common module planning, structural grid line spacing may be for example 30' (or metric equivalent), or 2.5 times the common 12' planning module spacing, while planning sub-module grid line spacing may be for example 6' (or metric equivalent), or half the common 12' planning module spacing. In the case of "compact" module planning, structural grid line spacing may be for example 22' (or metric equivalent), or double the compact 11' planning module spacing, while planning sub-module grid line spacing may be for example 5'-6" (or metric equivalent), or half the compact 11' planning module spacing. Combined, the parallel grid lines 101$x$ and the perpendicular grid lines 101$y$ form the universal planning grid 101, which provides an organizational logic and rigor for all of the major building elements, while maintaining the flexibility needed to meet the needs of complex projects. Either "common" or "compact" planning modules may be used for the design of an entire project, depending on the project's requirements, or in some cases both "common" and "compact" planning modules may be used in combination within a single project.

Figure 3:
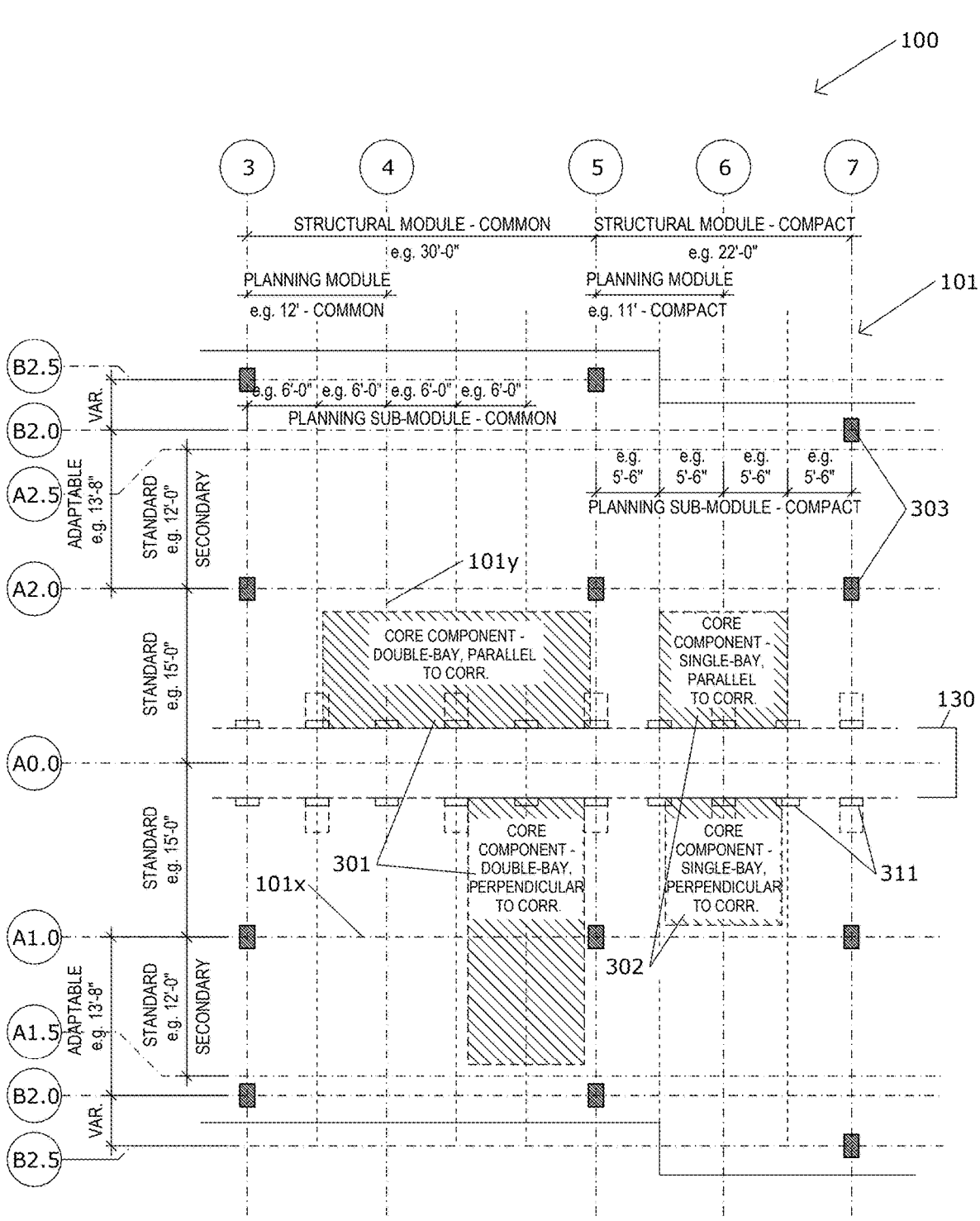
FIG. 3 is a dimensioned plan of the universal planning grid, with example building component locations illustrated in relationship to the planning grid, according to principles of the disclosure.

FIG. 3 is a dimensioned plan of the universal planning grid 101, with example building component locations illustrated in relationship to the planning grid. Major shell components 301 and 302, such as staircases, elevator shafts, electrical rooms, and trash/recycling rooms, may be aligned parallel or perpendicular to the corridor, aligned to the face of or centered between planning module grid lines 101$y$. Structural core and shell elements 303, such as for example structural columns, may be located at the intersections of parallel grid lines 101$x$ and perpendicular grid lines 101$y$. Residential services core elements 311, such as for example residential sanitary risers and residential exhaust shafts, may be located along the face of corridor and centered on perpendicular planning grid lines 101$y$.

Figure 4A:
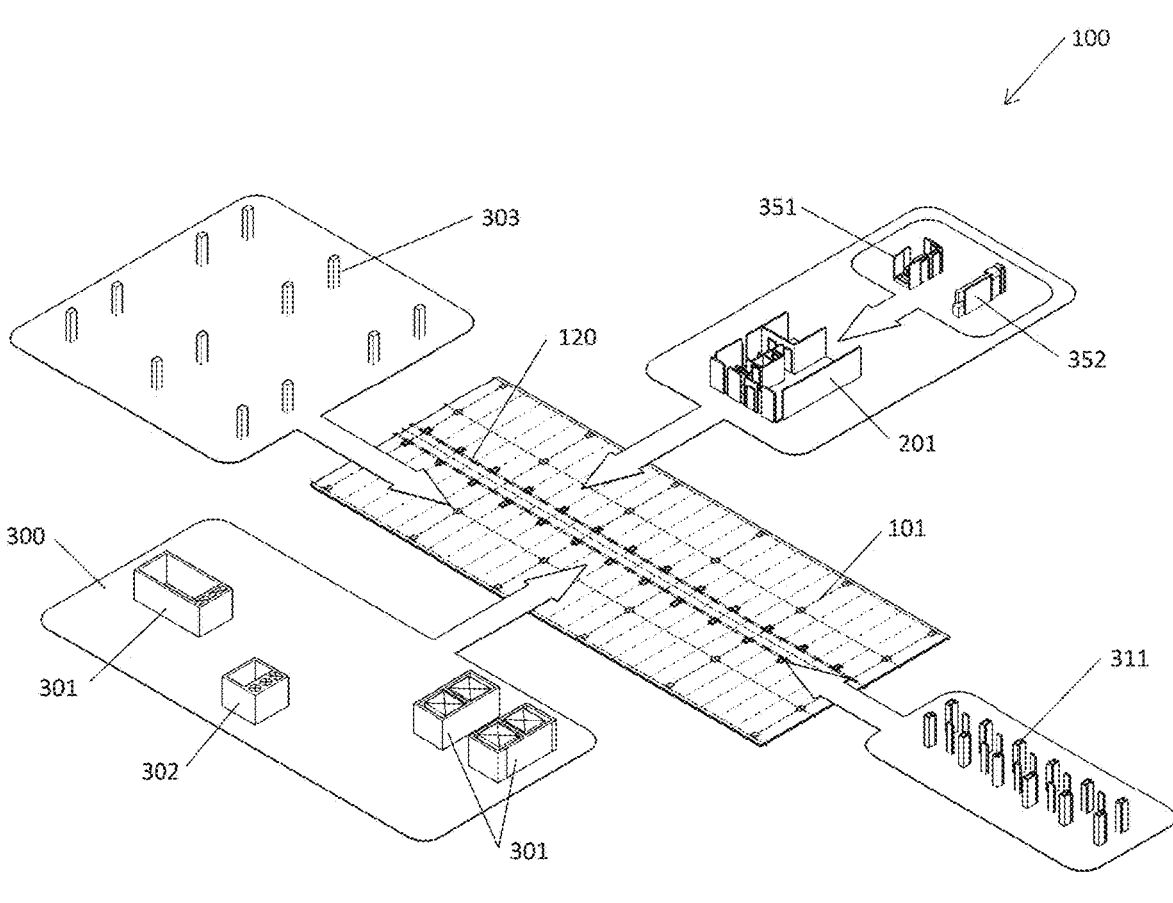
FIG. 4A is an exploded isometric view and FIG. 4B is an aggregated isometric view of an example multifamily residential building floor plate illustrating the process of using design frameworks to guide design and incorporation of specific building parts in the "nested" relationships described above, according to principles of the disclosure.
Figure 4B:
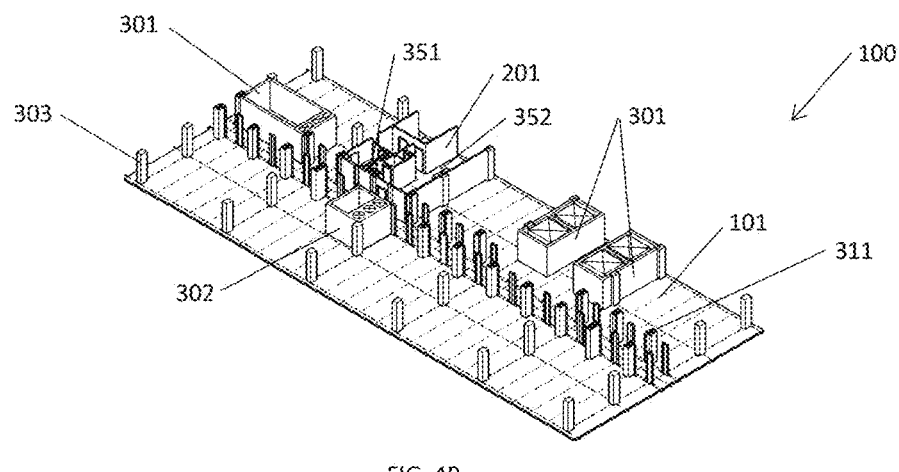

FIG. 4A is an exploded isometric view and FIG. 4B is an aggregated isometric view of an example multifamily residential building floor plate illustrating the process of using design frameworks to guide design and incorporation of specific building parts in the "nested" relationships described above. Within the design platform 100, building parts are organized by the universal planning grid 101. Major core components 300, which include components in full-size 301 and half-size 302 standardized outside dimensions, may be located along the primary circulation corridor 120. Full-size major core components 301 and half-size major core components 302 may be oriented with the long dimension either parallel or perpendicular to the corridor. Structural core elements 303 and residential services core elements 311 may be located in the building, and coordinated with other building uses that may stack above or below residential uses such as office/amenity and/or parking, prior to the mapping of Level 2A residential units 201. Level 2B residential unit components, which may include for example residential unit bathrooms 351 and residential unit kitchens 352, may be selected and adapted for incorporation within the residential unit design frameworks based on client or user preference and code requirements, such as for example handicap accessibility. The aggregated isometric view of FIG. 4B illustrates the consistent fit of the major building parts with respect to each other, across all buildings designed and constructed using the system.

Figures 5A, 5B:
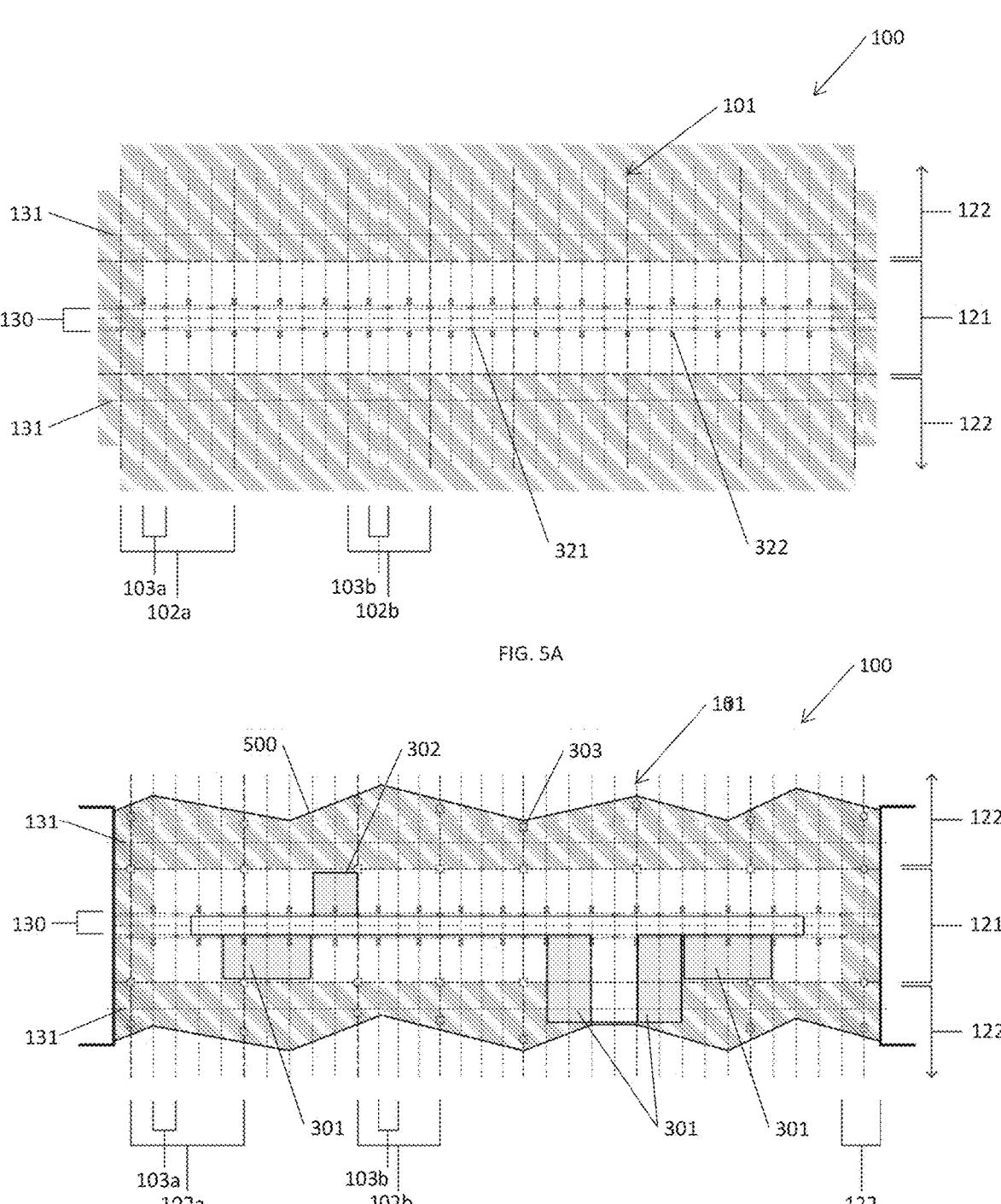
FIG. 5A is a floor plan view of a Level 1 universal planning grid indicating dimensional guidelines and zones of standardization and adaptability.
FIG. 5B, is an example application illustrating potential locations of major building elements matched to the planning grid and a conceptual variable façade perimeter illustrating the flexibility within the zones of adaptability, according to principles of the disclosure.

FIG. 5A is a floor plan view of a Level 1 universal planning grid indicating dimensional guidelines and zones of standardization and adaptability, and FIG. 5B is an example application illustrating potential locations of major building elements matched to the planning grid and a conceptual variable façade perimeter illustrating the flexibility within the zones of adaptability. Building designs are organized by the universal planning grid 101. Consistent zones of standardization 121 and zones of adaptability 122 are established for application to all projects designed using the platform. Major planning guidelines 102$a$ and 102$b$ are established, coordinated between the residential and parking uses that may stack within a building, and minor planning guidelines 103$a$ and 103$b$ are established in relation to the major planning guidelines. Residential building services are pre-coordinated through the use of a standard residential services core 130 and secondary residential services guidelines 131. Within the residential services core 130, optional locations are provided for vertical plumbing risers 321 and vertical exhaust air shafts 322. FIG. 5B illustrates hypothetical locations for structural elements 303, a common circulation corridor 120, major Level 1b core parts 301 and 302, and a hypothetical façade perimeter 500, all overlaid on a Level 1 universal planning grid 101.

Figure 6A:
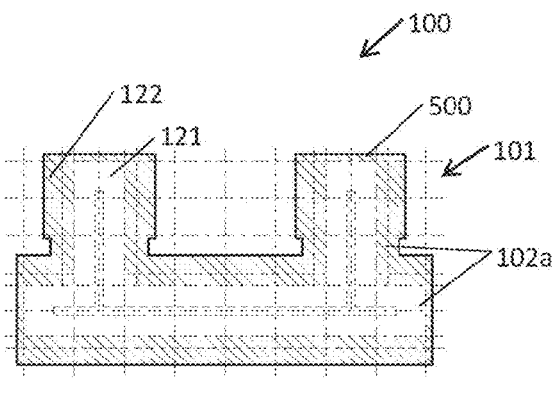
FIGS. 6A-6F are illustrations of example sample range of potential building floor plan shapes respecting the zones of standardization and taking advantage of zones of adaptability built into the platform, according to principles of the disclosure.
Figure 6D:
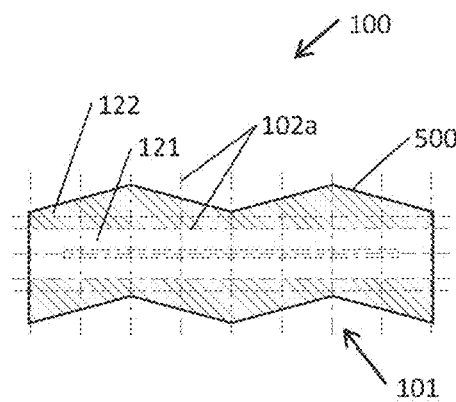
Figure 6B:
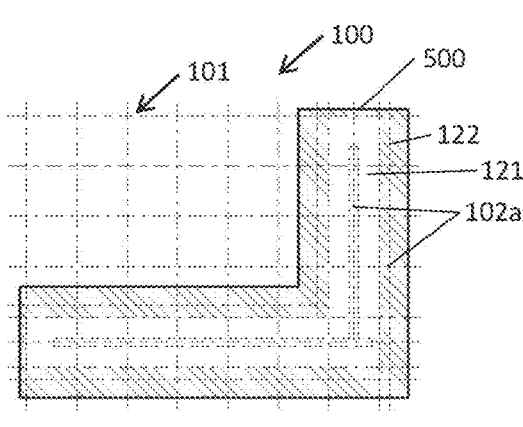
Figure 6E:
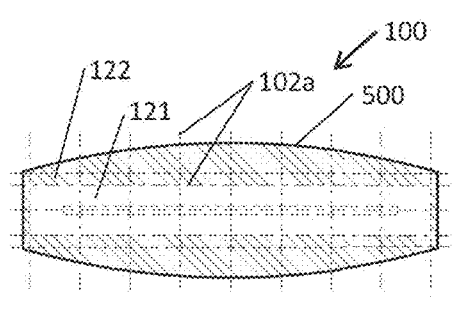
Figure 6C:
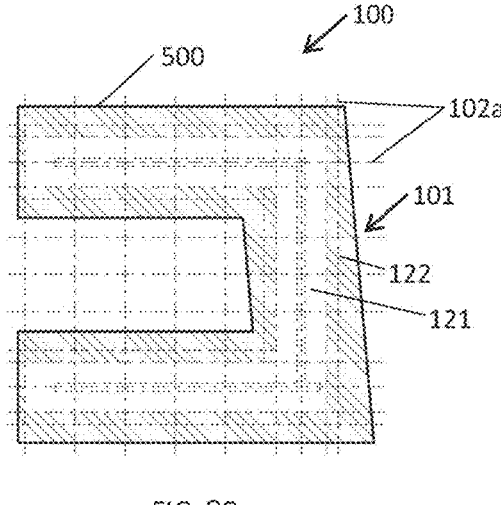
Figure 6F:
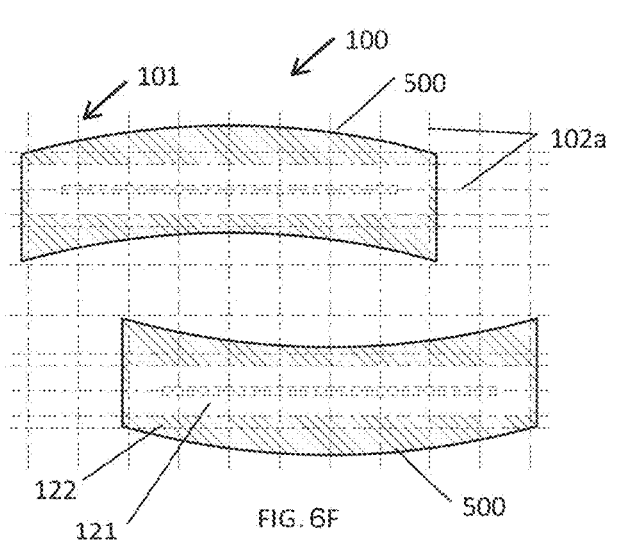

FIGS. 6A-6F illustrate a sample range of potential building floor plan shapes respecting the zones of standardization and taking advantage of zones of adaptability built into the platform. For each of FIGS. 6A-6F, each having different shapes, the example design platform 100, which may be applied in different shapes, provides a universal planning grid 101 incorporating major planning guidelines 102*a* and zones of standardization 121 and zones of adaptability 122. The layout of the floor plans on the universal planning grid 101 and the hypothetical building façade perimeters 500 are shown in a range of possible configurations and shapes to illustrate the range of site- and program-specific solutions enabled by the design platform 100. FIG. 6A illustrates a bar-shaped building, with perpendicular wings offset from the ends of the bar. FIG. 6B illustrates an ell-shaped building. FIG. 6C illustrates a C-shaped building, with the center section of the C at a non-orthogonal angle to the end sections. FIG. 6D illustrates a bar-shaped building with angled facades, the angled faces of which may or may not stack in the same locations vertically from floor to floor. FIG. 6E illustrates a bar-shaped building with curved façades. FIG. 6F illustrates a campus of two bar-shaped buildings with curved façades, coordinated on a universal design planning grid 101, and, further, illustrates how the universal design planning grid 101 may be extended beyond the footprint of the residential floors to coordinate other uses such as office, retail, amenity spaces, and parking below the residential floors.

FIGS. 7A-7C illustrate a sample range of potential building sections showing potential mixes of uses such as residential, commercial/amenity, and parking, and respecting zones of standardization and taking advantage of zones of adaptability built into the platform. For each of the Figures, the example design platform 100 provides a universal design planning grid 101 incorporating zones of standardization 121 and zones of adaptability 122. The sections of the residential portions of the buildings are laid out on the universal planning grid 101 and the hypothetical building façade perimeters 500 are shown in a range of possible configurations and shapes to illustrate the range of site- and program-specific solutions enabled by the design platform 100. FIG. 7A illustrates an example of a mid- to high-rise building in which residential use floors 151 may stacked over commercial/amenity use floors 152, which may be stacked over below-grade parking use floors 153. FIG. 7B illustrates an example of a mid- to high-rise building in which residential floors 151 may be stacked over above-grade parking floors 153, which may be stacked over on-grade commercial/amenity floors 152 which may be further stacked over below-grade parking floors 153. FIG. 7C illustrates an example of a mid-rise building in which up to five floors of residential use 151 may be partially stacked over up to two floors of parking use 153 and/or commercial/amenity use 152. In all cases, residential use 151 may be incorporated into floors with other uses.

Figure 8:
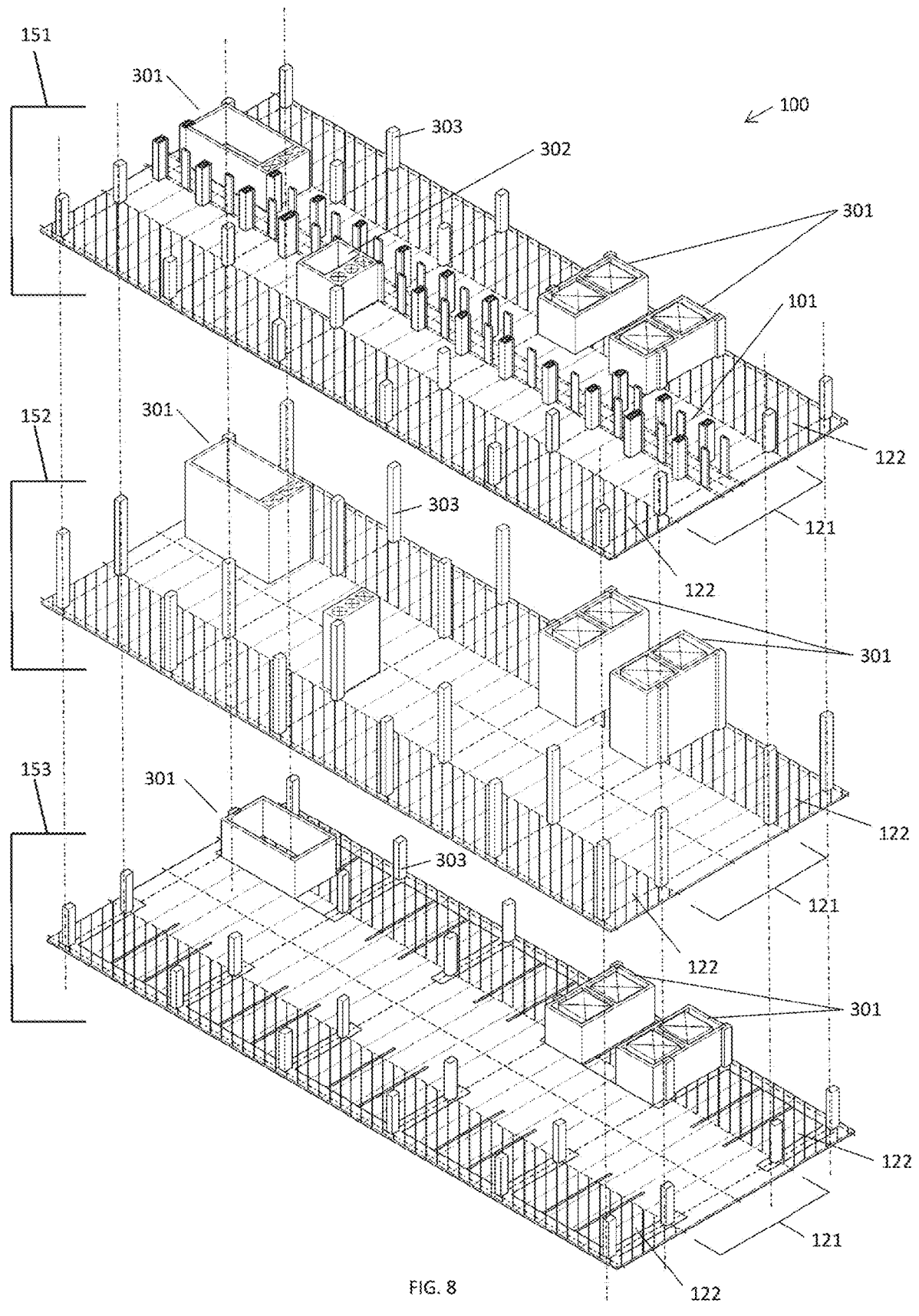
FIG. 8 is an exploded isometric view indicating the coordinated stacking of structure, core elements, and building services through a vertically-stacked range of uses, including residential, commercial/amenity, and parking, according to principles of the disclosure.

FIG. 8 is an exploded isometric view indicating the coordinated stacking of structure, core elements, and building services through a vertically-stacked range of uses, including residential, commercial/amenity, and parking. The use of the universal planning grid 101 allows structural elements 303 and major shell core components 301 and 302 to be pre-coordinated through different uses on different floors, such as for example residential use 151, commercial/amenity use 152, and/or above- or below-grade parking use 153. Note that the residential services core 130 may or may not be incorporated into commercial/amenity use floor(s) 152.

Figures 9A, 9B:
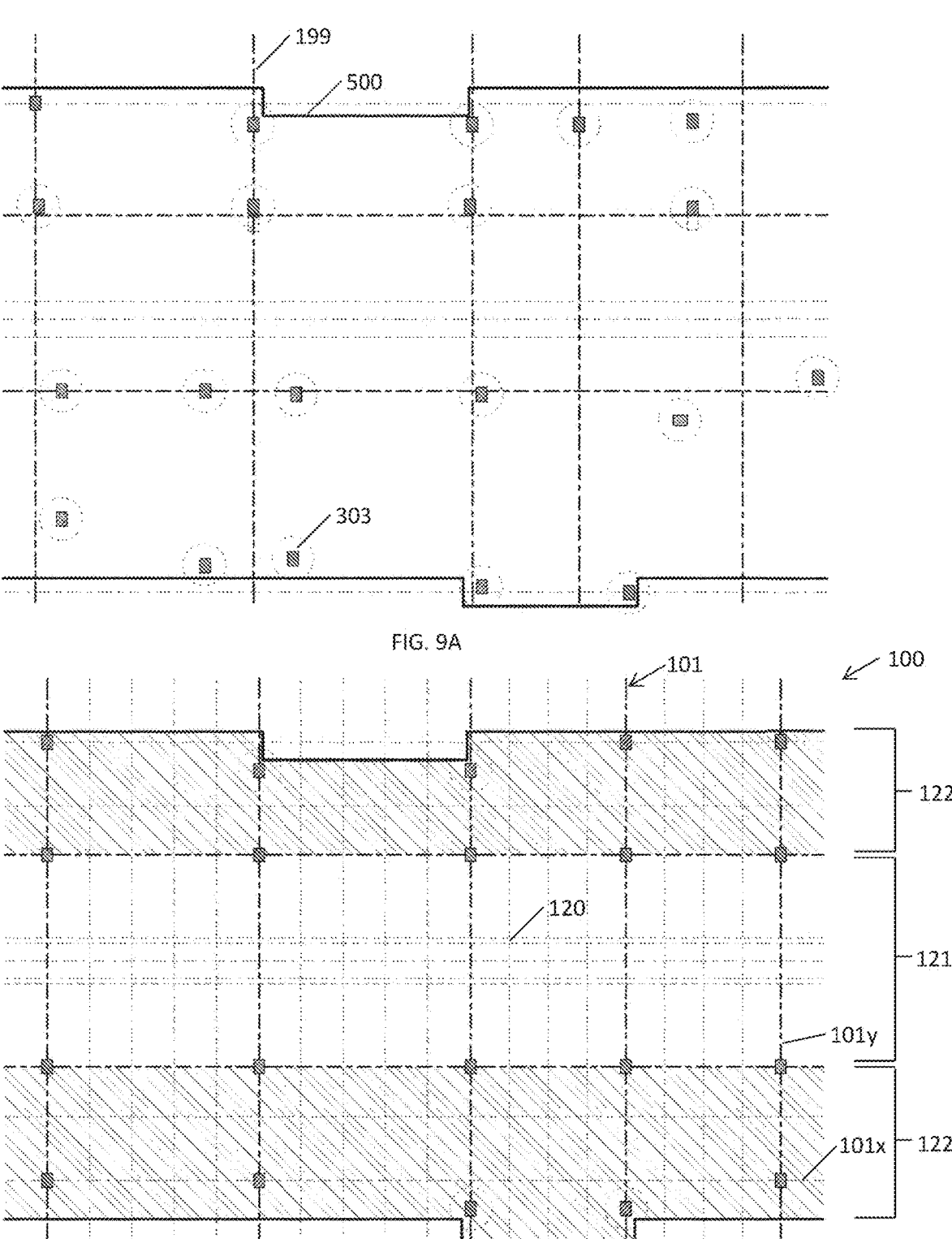
FIGS. 9A and 9B are example partial floor plans illustrating the difference between a conventionally-designed outside-in structural plan and a structural plan designed using this platform, according to principles of the disclosure.

FIGS. 9A and 9B are example partial floor plans illustrating the difference between a conventionally-designed outside-in structural plan and a structural plan designed using this platform. FIG. 9A illustrates a typical structural grid 199 and building façade perimeter 500 designed using the conventional outside-in design methodology. In this example, which for the purposes of this illustration has been copied from a completed project and therefore is not hypothetical, the structural elements 303 have been located after the completion of the residential unit mapping and design, as is customary for the outside-in design methodology. As a result, structural elements 303 are not aligned to grid lines on one or both axes of the grid. Structural elements 303 in this example that are not aligned to two intersecting grid lines are circled for emphasis. FIG. 9B illustrates a hypothetical application of the design platform 100 to the same building program, site, and form. The universal planning grid 101 provides consistent rules for the location of structural elements 303 in both the zone of standardization 121, in which the structural elements 303 are aligned to the intersection of grid lines on both axis, and in the zones of adaptability 122, in which the structural elements are aligned to major grid lines 101*y* that are perpendicular to a common circulation corridor 120, but need not align to secondary grid lines 101*x* that are parallel to a common circulation corridor 120.

FIGS. 10A-10C illustrate a method of maintaining a consistent relationship between Level 1A shell components and Level 2A residential unit design frameworks. FIG. 10A illustrates two standard sizes for major core components 300, a full-width component 301 and a half-width component 302, both of equal depth. FIG. 10B illustrates a range of primary core functions 330 and potential locations for secondary core functions 331 that may be incorporated within each core component of types 301 and 302. Primary core functions 330 may include stairs, elevators, trash rooms, and electric and/or tele/data rooms. Secondary core functions 331 may include retail exhaust shafts, HVAC lineset risers, roof drainage leaders, outside air intake shafts, and others as may be appropriate for a specific project. In this manner, accessory functions 331 that might otherwise in conventional inside-out or outside-in design methodologies interfere with the designs of residential units may in the use of this innovation result in pre-coordinated locations (the core components 300) such that the integrity of the residential unit design frameworks 201 is maintained at all times, as shown in FIG. 10C. Stray locations of secondary core functions 331 are to be avoided, as indicated by the "X" drawn in FIG. 10C.

Figure 11A:
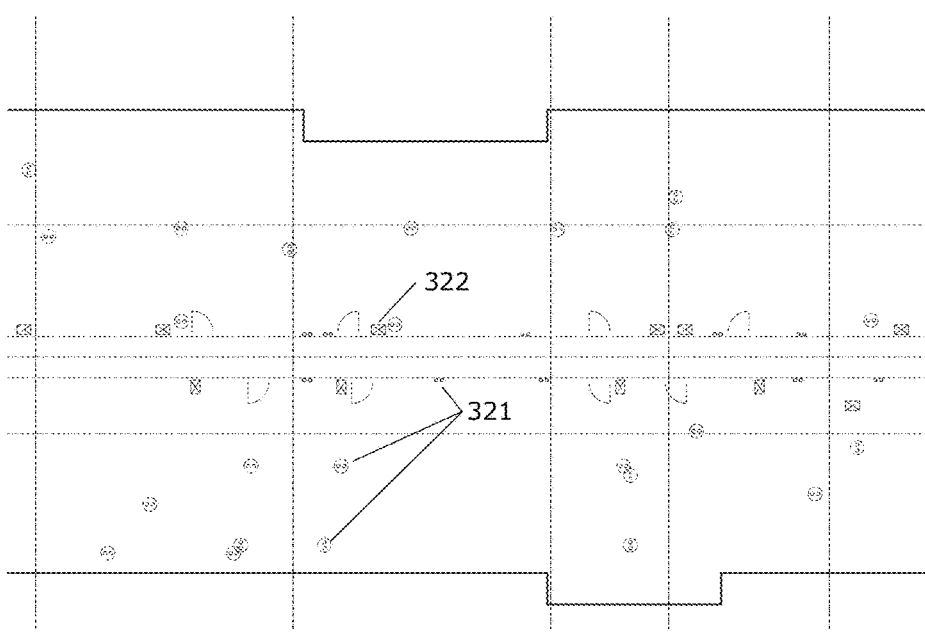
FIGS. 11A and 11B are example partial floor plans illustrating the difference between conventionally-designed outside-in HVAC and plumbing distribution and HVAC and plumbing distribution designed using novel principles of the disclosure.
Figure 11B:
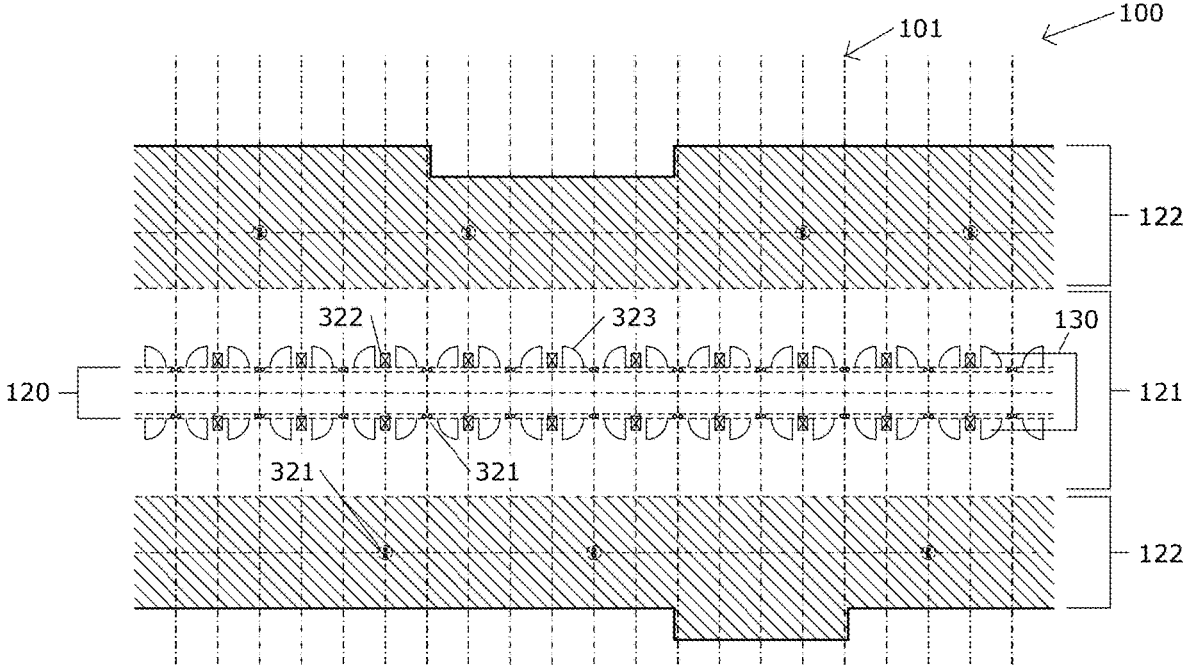

FIGS. 11A and 11B are example partial floor plans illustrating the difference between conventionally-designed outside-in HVAC and plumbing distribution and HVAC and plumbing distribution designed using this platform. FIG. 11A illustrates typical exhaust duct risers 322 and plumbing drainage risers 321 designed using the conventional outside-in design methodology. In this example, which for the purposes of this illustration has been copied from a completed project and therefore is not hypothetical, the typical exhaust duct risers 322 and plumbing drainage risers 321 have been located after the completion of the residential unit mapping and design, as is customary for the outside-in design methodology. As a result, typical exhaust duct risers 322 and plumbing drainage risers 321 are typically not aligned to corridor walls or other common elements. Typical exhaust duct risers 322 and plumbing drainage risers 321 in this example that are not aligned to corridor walls or other common elements are circled for emphasis. FIG. 11B illustrates a hypothetical application of the design platform 100 to the same building program, site, and form. The universal planning grid 101 provides consistent rules for the location of typical exhaust duct risers 322 and plumbing drainage risers 321 in both the residential services core 130, in which the typical exhaust duct risers 361 and plumbing drainage risers 362 are aligned to planning grid lines along a common circulation corridor 120, and in the zones of adaptability 122, in which the typical exhaust duct risers 322 and plumbing drainage risers 321 are aligned to secondary grid lines 109 that are parallel to a common circulation corridor 120. As a method to coordinate the residential unit design frameworks with the residential services distribution, possible residential unit entry door locations 333 are pre-coordinated with the service distribution risers 321 and 322. Note that the locations of example exhaust duct risers 322 and plumbing drainage risers 321 within the residential services core 130 are optional, and may or may not all be used in specific building design applications depending on need and coordination with residential unit design frameworks.

Figure 12A:
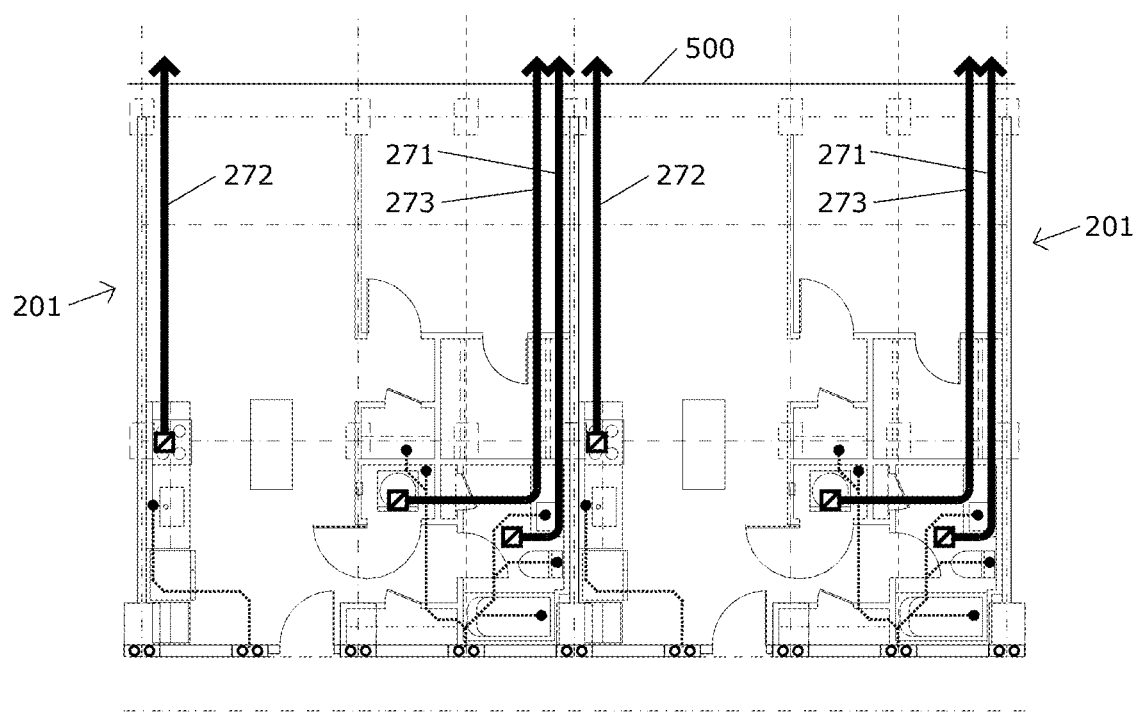
FIGS. 12A-12D are example illustrations that illustrate the range of options for residential unit exhaust routing through and out of the building that is pre-coordinated by the platform, i.e. does not require special design accommodations for any of the possible exhaust design solutions illustrated, according to principles of the disclosure.
Figure 12B:
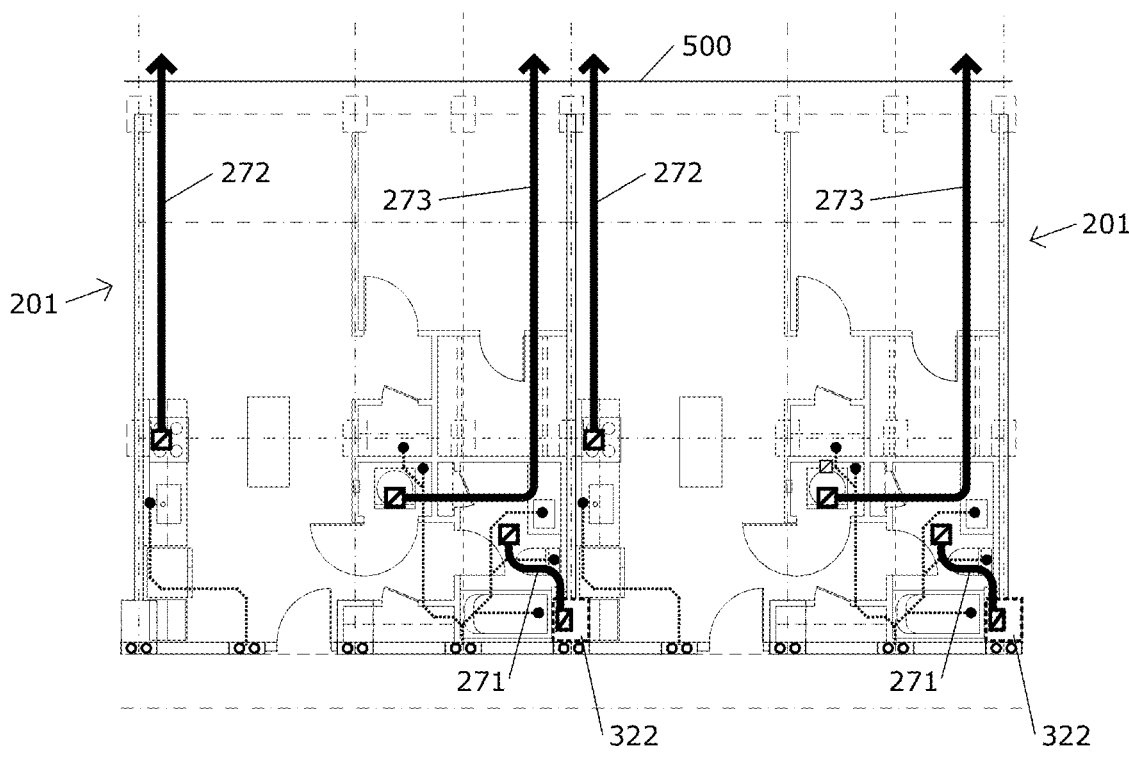
Figures 12C, 12D:
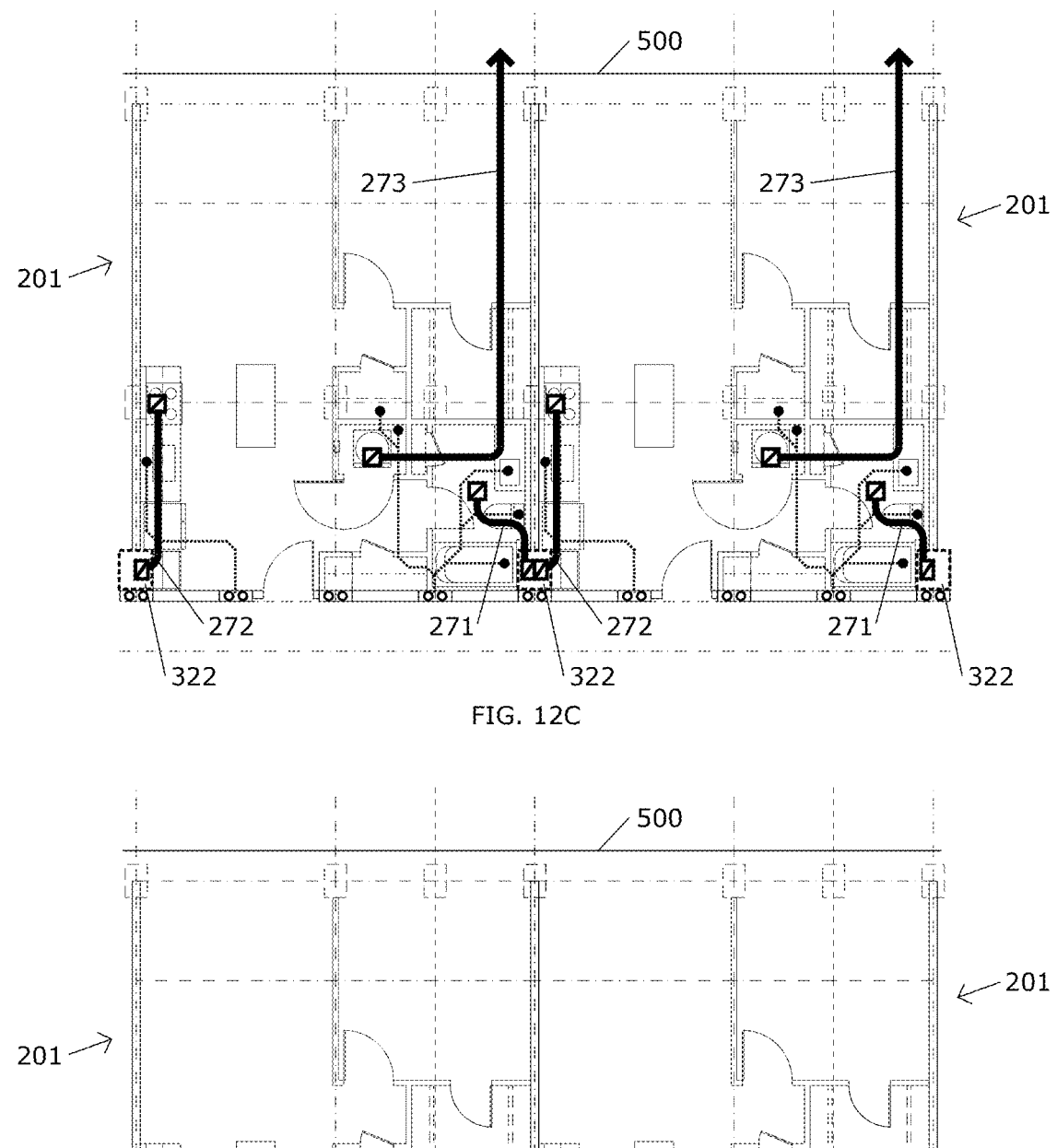

FIGS. 12A-12D illustrate the range of options for residential unit exhaust routing through and out of the building that is pre-coordinated by the platform, i.e. does not require special design accommodations for any of the possible exhaust design solutions illustrated. In FIG. 12A, all residential unit exhaust ducts, for example bathroom exhaust ducts 271, kitchen exhaust ducts 272, and laundry exhaust ducts 273, are routed along the ceiling of the residential unit design framework 201 to the exterior façade perimeter 500. In this case, all of the Level 1B building core infrastructure vertical exhaust duct risers 322 remain unused and, if unused on floors above or below as well, may be converted to usable space within the residential unit. In FIG. 12D, all residential unit exhaust ducts are routed to Level 1B building core infrastructure vertical exhaust duct risers 322. In FIGS. 12B and 12C, some residential unit exhaust ducts are routed along the ceiling of the residential unit design framework 201 and some are routed to Level 1B building core vertical exhaust duct risers 322, as may be appropriate for client preference, engineering benefit, or other factors. Note that within the same building different routing options may be selected for different locations in the building, for example, due to client preference all exhaust ducts in units facing a primary façade may be routed to internal Level 1B building core infrastructure vertical exhaust duct risers 322, while some or all exhaust ducts in units facing away from primary façades may be routed along the ceiling of the residential unit design framework 201 to the exterior façade perimeter 500.

Figure 13:
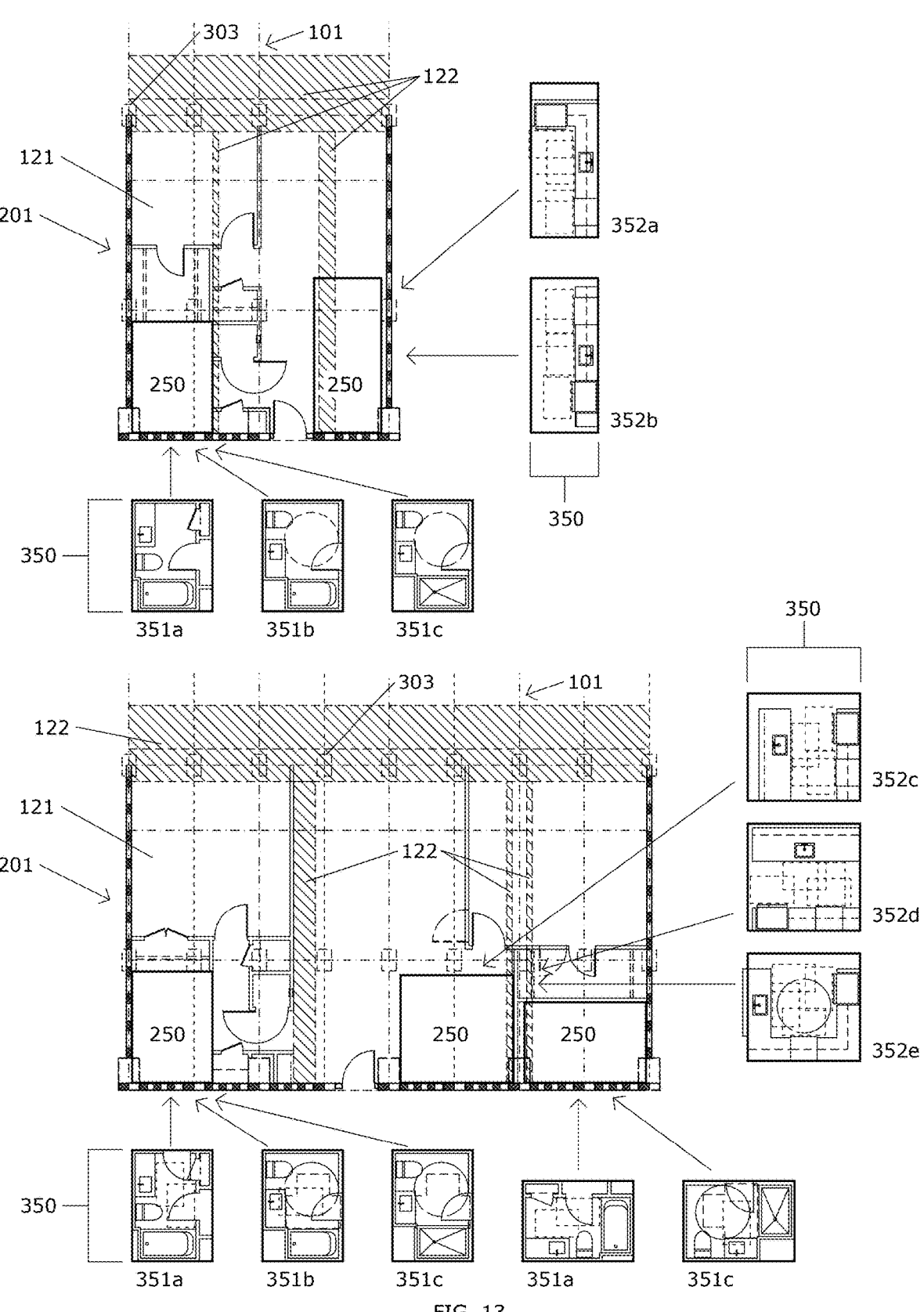
FIG. 13 is an illustration that illustrates two examples of typical Level 2A residential unit design frameworks and a sample of possible pre-designed Level 2B residential unit components, demonstrating a range of standard solutions that may be pre-designed for the platform and available for incorporation into any project that uses the platform, according to principles of the disclosure.

FIG. 13 illustrates two examples of typical Level 2A residential unit design frameworks 201 and a sample of possible pre-designed Level 2B residential unit components 350, demonstrating a range of standard solutions that may be pre-designed for the platform and available for incorporation into any project that uses the platform. A sample Level 2A residential unit design framework 201 may include zones of standardization 121 and zones of adaptability 122 to allow for variations in unit size and building façade design, and further may include potential locations for Level 1B building core structural infrastructure elements 303 that are pre-coordinated with the universal planning grid 101 and may allow Level 2A residential unit design frameworks 201 to be mapped to desired locations throughout the building with no modifications required. Within each Level 2A residential unit design framework 201 may be pre-determined and appropriately-sized locations for Level 2B residential unit components 250, such as for example but not limited to a range of options for residential unit bathroom types 351a through 351c and residential unit kitchen types 352a through 352e. The pre-determined locations 250 may be consistent across residential unit design framework designs 201 such that residential units designed using the design frameworks may readily accept Level 2B residential unit components 350 without need for modification of the design frameworks or implemented designs at either level.

Figure 14:
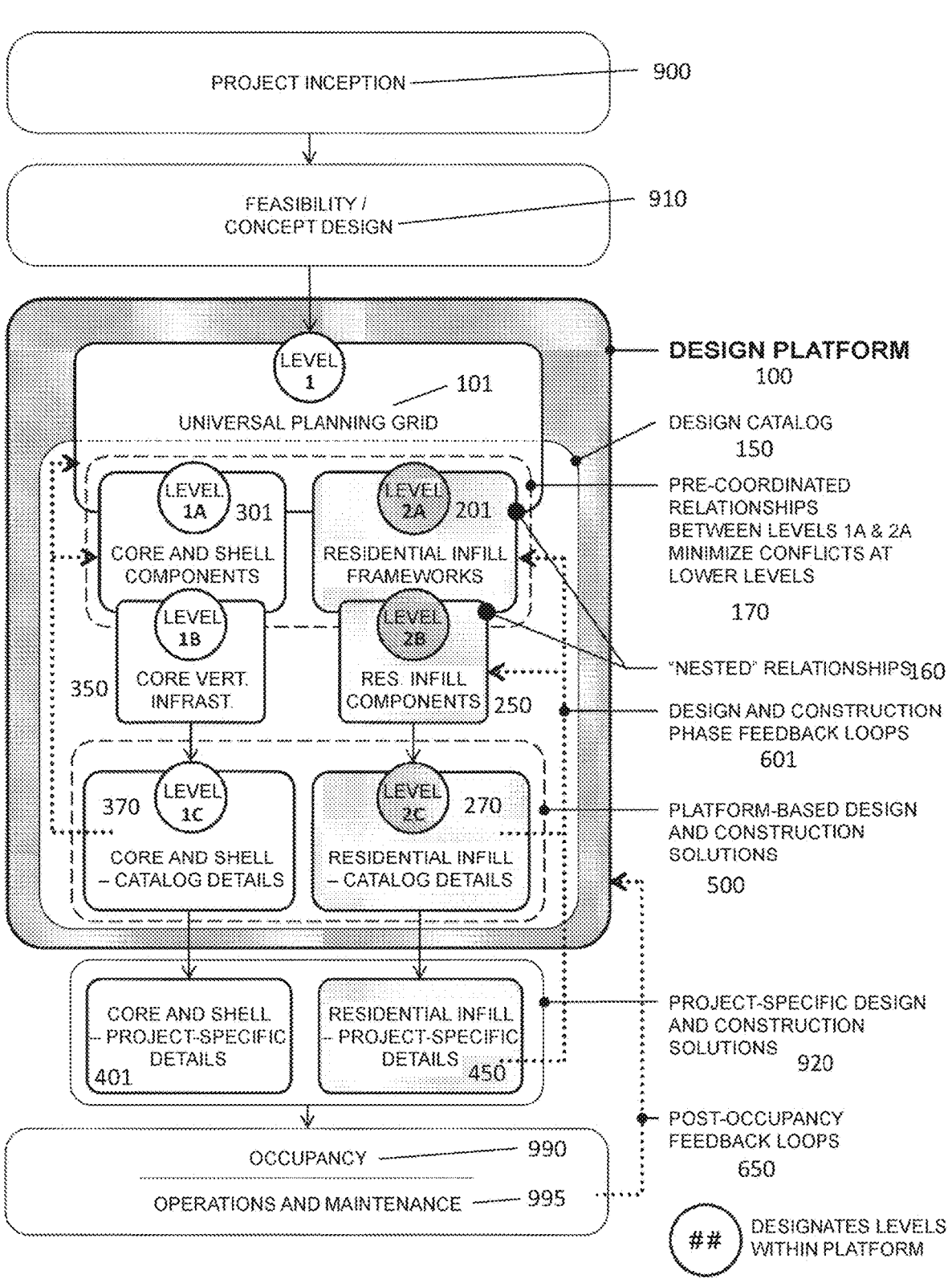
FIG. 14 is an organizational diagram indicating the major parts and relationships of the platform described herein, according to principles of the disclosure.

FIG. 14 is an organizational diagram indicating the major parts and relationships of the design platform described herein. The diagram illustrates the parts of a multifamily residential design and construction project from project inception 900 and feasibility/concept design 910 through occupancy 990 and operations and maintenance 995. In this diagram, the design platform 100 represents both the design and construction activities that may be undertaken based on the design platform. The design platform 100 is organized by the Level 1 universal planning grid 101. Within the design platform 100, the design catalog 150 comprises the Level 1A core components 301 and Level 2A residential infill unit design frameworks 201. The Level 1B core vertical infrastructure 350 nests into Level 1A core and shell components 301, independent of the infill Levels. The Level 2B residential infill components 250 nest into Level 2A residential infill frameworks 201, independent of the core and shell Levels. Within the catalog 150, the pre-coordinated relationships 170 between Level 1A core and shell components 301 and Level 2A residential infill unit design frameworks 201 are clearly and consistently defined and rigorously maintained throughout design and construction. Within the catalog 150, nested relationships 160 are maintained between the lower levels Level 1A 301, Level 2A 201, Level 1B 350, and Level 2B 250 and the levels immediately above as indicated. Within the design platform 100, core and shell catalog details Level 1C 370 represent pre-designed details that may provide construction details for any of the core and shell Levels above, and Residential infill catalog details Level 2C 270 represent pre-designed construction details that may be developed for the catalog to provide additional construction detail for any of the core and shell Levels above. Outside the design platform 100 are project-specific design and construction solutions 920, for example project-specific core and shell design and construction solutions 401 and Level 2C project-specific residential infill design and construction solutions 450. Maintaining separation between core and shell Level details and infill Level details allows for design and construction phase feedback loops 601 to incorporate project-specific lessons learned in the overall design platform 100.

Figures 15A, 15B, 15C:
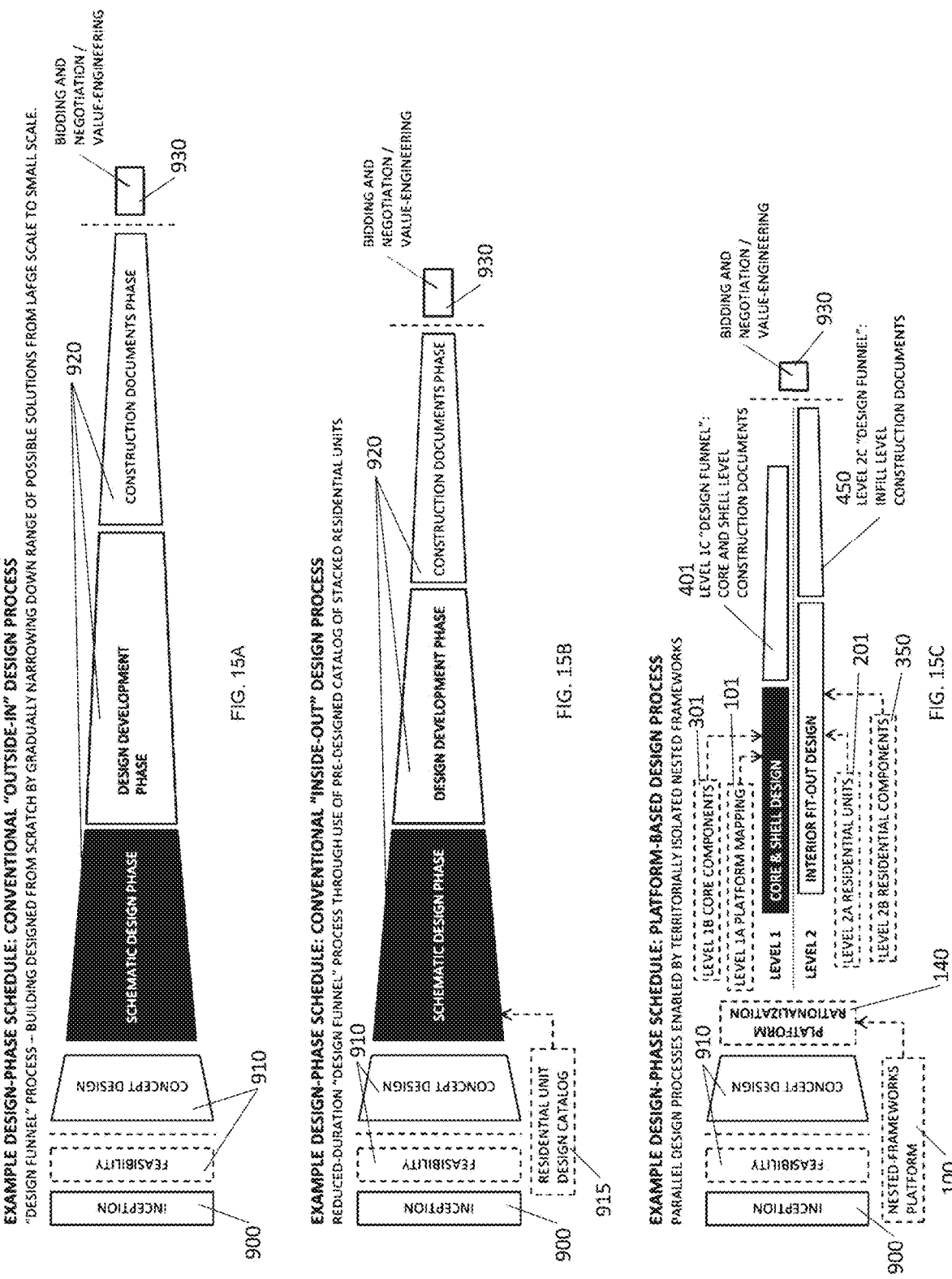
FIGS. 15A-15C are schedule diagrams indicating differences between a conventional multifamily residential design schedule of FIGS. 15A and 15B and an example platform-based multifamily design schedule of FIG. 15C, according to principles of the disclosure.

FIGS. 15A through 15C are schedule diagrams indicating differences between a conventional multifamily residential design schedule and an example platform-based multifamily design schedule. These figures address differences in design process between the approach described in this disclosure and common design approaches. FIG. 15A is an example "outside-in" design schedule comprising industry-standard phases project inception 900, feasibility study and concept design 910, project-specific design phases schematic design, design development, and construction documents 920, and a bidding and negotiation and value engineering phase 930. In the "outside-in" model, each project is designed from scratch, and possible solutions are narrowed down during each phase in a "design funnel" process. Durations shown are representative, and are roughly proportional to conventional practice. FIG. 15B is an example "inside-out" design schedule that illustrates potential schedule duration reductions made possible by working from a pre-designed catalog of standard unit types. In this model, the "design funnel" approach is still applied, and the durations of each phase may be reduced by the inclusion of standard unit types from a residential unit types catalog 915. FIG. 15C is an example design phase schedule illustrating a platform-based design process as described in this disclosure. In this model, a new platform rationalization step 140 is inserted after the feasibility and concept design phase 910, in which the concept design is rationalized to the design platform 100. Once the rationalization step 140 is completed, appropriate adaptable design frameworks and components from each of the platform Levels 1 101, 1A 301, 2A 201, and 2B 350 may be applied to meet the specific project requirements.

FIGS. 16A through 16C are schedule diagrams indicating differences between a conventional multifamily residential construction schedule and an example platform-based multifamily residential construction schedule. These figures address differences in design process between the approach described in this disclosure and common construction approaches. FIG. 16A is an example conventional on-site construction project, used in nearly all "outside-in"-designed projects and in most "inside-out"-designed projects, in which some elements (such as window systems) may be custom-fabricated off-site to meet project-specific requirements. In this example schedule, project mobilization 140 is followed by on-site construction activities 950, beginning with rough sitework, proceeding through building and interior construction, and then through site finish work, which may run parallel to completing base building and/or interior construction activities. The project then proceeds to closeout and turnover 980. FIG. 16B is an example full-modular construction schedule, in which off-site fabrication 970 may be performed by a single-source modular construction fabricator in a linear method, supported by suppliers 975 that deliver materials and products to the off-site fabrication facility. In this example, construction schedules may be reduced to the extent that on-site construction activities 950 and off-site full-modular construction activities 970 may be performed simultaneously. FIG. 16C is an example platform-enabled construction process in which off-site fabrication 970 may be performed by multiple fabricators, with the scope for each clearly defined by the level(s) in the design platform described in this disclosure. The parallel processing enabled by a distributed fabrication method and coordinated by a platform-based on-site construction and installation method may result in further construction duration savings beyond those achievable by single-source off-site fabrication. When designed and constructed according to the principles of this innovation, project closeout 980 may be divided between the Shell and Infill scopes of work.

Figure 17:
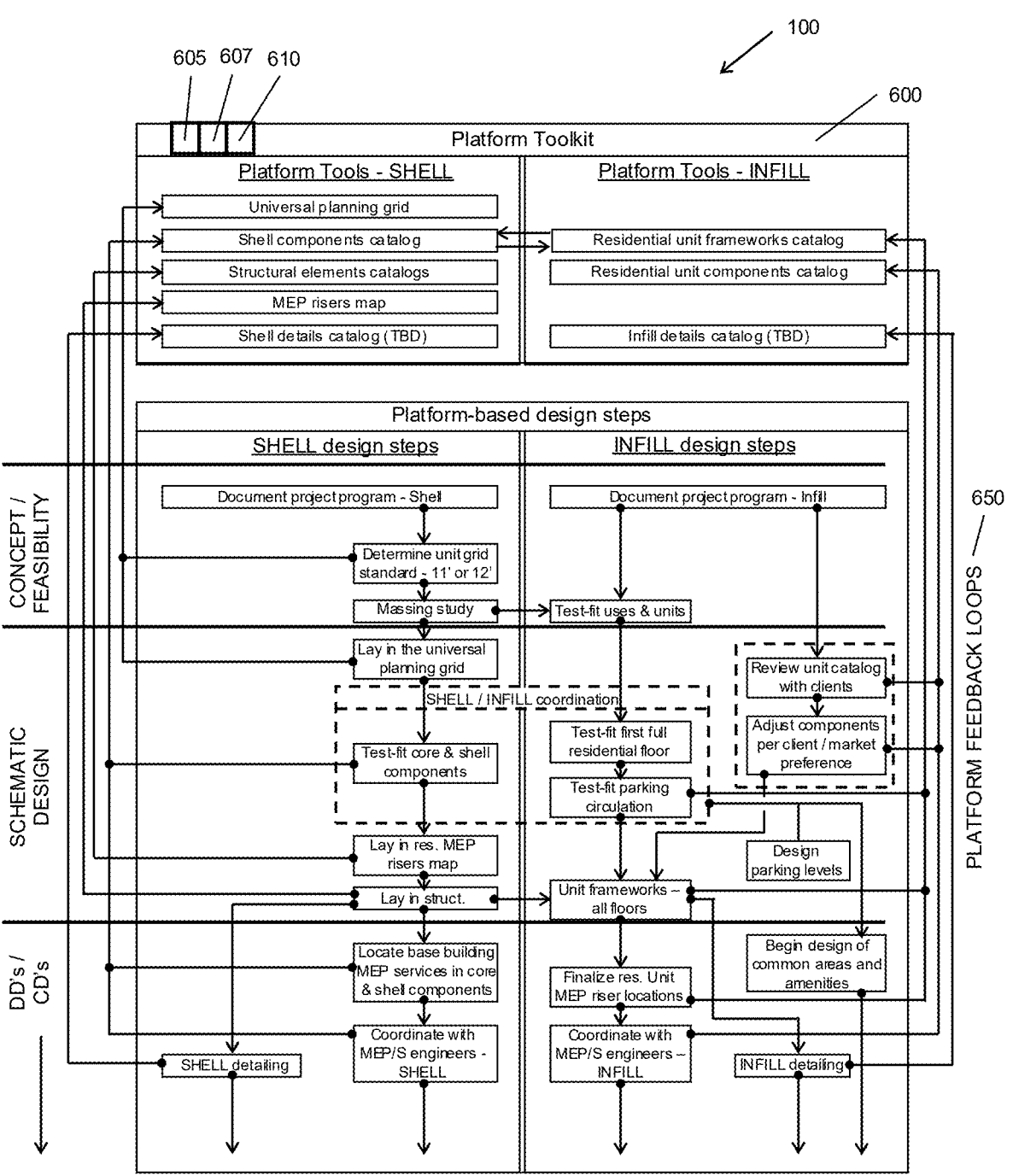
FIG. 17 is a diagram that illustrates the method in which the use of standardized tools captures feedback from prior projects for future use in new projects designed using the design platform.

FIG. 17 is a diagram that illustrates the method in which the use of standardized tools captures feedback from prior projects (integral element 6) for future use in new projects designed using the design platform. The design platform tools 600, including a processor 605, which may be any type of computer known to those of ordinary skill in the art, a computer-readable medium 607 for storing software for managing the platform-based design steps and any data described herein, a database 610 for storing data as described herein, including any building schematics produced. The processor 605 may be in communication over a network via a communication link to other processors or servers, and comprises an input/output component for receiving input and for outputting information such as schematics of the multi-family residence building (MFRB) produced by the processes herein. Processor 605 may also comprise a server. The design platform tools 600 further includes the universal planning grid and the design catalogs for the various levels within the platform, may be updated at regular intervals based on lessons learned and design improvements from specific stages within the design process for every project designed using the design platform 100. The improved tools then become the foundation for future projects. Innovations captured in the platform in this manner become the building blocks for future innovations. As the volume of projects completed using the design platform 100 increases, the rate of innovation within the platform as a whole may accelerate, which may in turn provide increased performance when compared with buildings designed and built conventionally, either in the stacked-units "inside-out" method or the mapped-units "outside-in" method.

The system and principles of the present disclosure may include advantages or features including, but not limited to:

1) Construction cost uncertainty (risk) may be reduced, through increased rates of repetition and predictability.
2) Direct construction costs may be reduced, through increased repetition and predictability and through the potential use of off-site fabrication.
3) Design durations may be reduced, through the use of the platform as a starting point rather than the conventional method of starting from scratch on each project, and through the use of parallel processing of design tasks.
4) Construction durations may be reduced, through simplified on-site construction and through the potential use of off-site fabrication for parallel processing of construction tasks.
5) Design conflicts may be reduced.
6) Construction conflicts and change orders may be reduced.
7) Buildings built using the system may be easier and less costly to maintain and upgrade due to the consistency of locations for and potential for improved access to the distribution of mechanical, electrical, plumbing, and other services throughout the building.
8) Changes during design, such as revisions to unit mixes within a building or addition of major mechanical air shafts, may be more efficiently accommodated, potentially saving time and cost and reducing the potential for conflicts caused by design changes later in the design documentation process.
9) Incorporation of off-site fabrication practices in complex multifamily residential buildings may be accelerated, through increased repetition and predictability and through consistency of application across projects.
10) The platform may facilitate phased construction, vertically and horizontally, through rigorous consistency of locations and pathways for building elements such as structural, HVAC, electrical, and plumbing systems.
11) The platform may serve as a technology innovation accelerator.
12) Buildings designed using the platform may be more flexible in use over time, since the residential unit infill is independent of the building's structure and services distribution. This in turn may result in longer-lasting buildings with a greater ability to meet changing market priorities cost effectively.
13) Building performance may be improved, through feedback loops and the re-allocation of time from the conventional start-from-scratch approach to an approach that allows greater focus on project-specific building performance goals and opportunities.
14) Use of the platform may allow for new vertically-integrated design and construction delivery models.

Multifamily residential buildings and similar building types built according to the platform-based principles of this disclosure may offer a significant improvement over current industry practices for design and construction of residential buildings, in that the design frameworks and associated catalogs of pre-designed and pre-coordinated building parts that make up the platform approach as described in this disclosure provide a new approach to optimizing design and construction for both construction efficiency and market efficiency.

The following clauses comprise aspects of the disclosure:

Clause 1: A method for designing and building a multi-family residence building (MFRB), comprising defining a universal planning grid (UPG) to coordinate nesting of a plurality of smaller-scale design formats within the dimension designated by the universal planning grid, wherein the universal planning grid guides volume scale of the MFRB; defining rules to guide interfaces among the smaller-scale design formats; and constructing a MFRB according to the universal planning grid and the defined rules.

Clause 2: The method of clause 1, wherein in the step of defining the universal planning grid, the UPG defines dimensional standards and locational rules for the MFRB.

Clause 3: The method of clause 1, wherein each of the smaller scale design formats comprise a Level, with one Level scaled to nest into a larger-scaled Level above.

Clause 4: The method of clause 3, further comprising identifying at least one zone of standardization and at least one zone of adaptability for each Level.

Clause 5: The method of clause 1, wherein the UPG and the smaller scale design formats comprise a plurality of nested Levels, the plurality of nested Levels separated into Core and Shell Levels including Level 1A, Level 1B and Level 1C, and the plurality of Levels also organized into Infill Levels including Level 2A, Level 2B and Level 2C.

Clause 6: The method of clause 4, wherein Level 1A defines core and shell components including one or more of: risers, stair shafts, elevator shafts, trash stacks and electrical rooms while Level 2A separates residential units scale infill.

Clause 7: The method of clause 5, wherein Level 1B defines core and shell vertical infrastructure including mechanical, electrical and plumbing service distribution, while Level 2B defines residential component-scale infill including one or more of kitchens, bathrooms, closets, and heating, ventilation and air conditioning (HVAC) closets.

Clause 8: The method of clause 5, wherein each Level is at a different scale.

Clause 9: The method of claim 5, wherein nested Levels coordinate stacking of structure, core elements and building services in the MFRB.

Clause 10: A system (or apparatus) for designing and building a multi-family residence building (MFRB), comprising: a processor having a tangible computer readable medium with computer executable instructions therein for executing a process comprising: defining a universal planning grid (UPG) to coordinate nesting of a plurality of smaller-scale design formats within the dimension designated by the universal planning grid, wherein the universal planning grid guides volume scale of the MFRB; defining rules to guide interfaces among the smaller-scale design formats; and constructing one or more schematics for building a MFRB according to the universal planning grid and the defined rules; and an input/output device for outputting the one or more schematics.

Clause 11: The system of clause 10, wherein the UPG defines dimensional standards and locational rules for the MFRB.

Clause 12: The system clause 10, wherein each of the smaller scale design formats comprise a Level, with one Level scaled to nest into a larger-scaled Level above.

Clause 13: The system of claim 12, further comprising the step of identifying at least one zone of standardization and at least one zone of adaptability for each Level.

Clause 14: The system of clause 10, wherein the UPG and the smaller scale design formats comprise a plurality of nested Levels, the plurality of nested Levels separated into Core and Shell Levels including Level 1A, Level 1B and Level 1C, and the plurality of Levels also organized into Infill Levels including Level 2A, Level 2B and Level 2C.

Clause 15: The system of clause 14, wherein Level 1A defines core and shell components including one or more of: risers, stair shafts, elevator shafts, trash stacks and electrical rooms while Level 2A separates residential units scale infill.

Clause 16: The system of clause 14, wherein Level 1B defines core and shell vertical infrastructure including mechanical, electrical and plumbing service distribution, while Level 2B defines residential component-scale infill including one or more of kitchens, bathrooms, closets, and heating, ventilation and air conditioning (HVAC) closets.

Clause 17: The system of clause 14, wherein each Level is at a different scale.

Clause 18: The system of clause 14, wherein nested Levels coordinate stacking of structure, core elements and building services in the MFRB.

Clause 19: The system of clause 10, further comprising developing a design catalog and made up of adaptable building elements in all levels, including, at Level 1, standardized predetermined locations for structural and MEP services serving the Shell and Infill Levels.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "network," as used in this disclosure, means an arrangement of two or more communication links. A network may include, for example, a public network, a cellular network, the Internet, a local area network (LAN), a wide area network (WAN), a metropolitan area network (MAN), a personal area network (PAN), a campus area network, a corporate area network, a global area network (GAN), a broadband area network (BAN), any combination of the foregoing, or the like. The network may be configured to communicate data via a wireless and/or a wired communication medium. The network may include any one or more of the following topologies, including, for example, a point-to-point topology, a bus topology, a linear bus topology, a distributed bus topology, a star topology, an extended star topology, a distributed star topology, a ring topology, a mesh topology, a tree topology, or the like.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, or the like.

The terms "including", "comprising" and variations thereof, as used in this disclosure, mean "including, but not limited to", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, computer instructions) which may be read by a computer except is not a transitory propagating signal encoding computer-readable instructions. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other non-transitory storage medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G, 4G or 5G cellular standards, Bluetooth, or the like.

Various modifications and variations of the described methods and systems of the invention will be apparent to those skilled in the art without departing from the scope and spirit of the invention. Although the invention has been described in connection with specific preferred examples, it should be understood that the invention should not be unduly limited to such specific examples.

What is claimed:

1. A method for designing and building a multi-family residence building (MFRB), comprising:

providing, via one or more processors, a design platform comprising a database and design platform tools stored on a computer-readable medium that manage a plurality of levels defining a nested design framework;

defining, via the one or more processors, a first level of the plurality of levels as a universal planning grid (UPG) that specifies dimensional standards and locational roles and coordinates nesting of at least some of the plurality of levels smaller in scale than the universal planning grid within dimensions designated by the universal planning grid, wherein the universal planning grid guides volume scale of the MFRB;

scaling, via the one or more processors, at least some of the plurality of levels to nest into at least one of the plurality of levels larger in scale than at least some of the plurality of levels;

applying, via the one or more processors, structural elements and major core components to a respective level of the plurality of levels, wherein the structural elements and the major core components are pre-coordinated to at least one additional level of the plurality of levels once the structural elements and the major core components are applied to the respective level of the plurality of levels;

identifying, via the one or more processors, at least one zone of standardization and at least one zone of adaptability for each of the plurality of levels, each of the at least one zone of standardization defining at least some of the structural elements aligned to an intersection of grid lines on two axes and defined by a common circulation corridor, each of the at least one zone of adaptability defining at least some of the structural elements aligned to one of the grid lines on the two axes parallel to the common circulation corridor;

defining and enforcing, via the one or more processors, rules to guide interfaces between the universal planning grid and at least some of the plurality of levels smaller in scale than the universal planning grid, the rules including mapping residential infill frameworks to desired locations without modification and coordinating core/shell components and the residential infill frameworks to minimize conflicts;

outputting, via an output component, building schematics of the MFRB that reflect the enforced rules and pre-coordinated relationships; and constructing the MFRB according to the building schematics;

wherein at least one of: the universal planning grid and design catalogs of a platform toolkit stored on a computer-readable medium are updated at regular intervals based on design improvements from specific stages via the one or more processors, further wherein the updating at regular intervals are based on design improvements from specific stages within the designing of the MFRB, the specific stages including at least one of: the defining of the first level of the plurality of levels as the universal planning grid, the scaling of at least some of the plurality of levels, the applying of the structural elements and the major core components to a respective level of the plurality of levels, the identifying of the at least one zone of standardization and the at least one zone of adaptability for each of the plurality of levels, and the defining of the rules to guide the interfaces between the universal planning grid and at least some of the plurality of levels smaller in scale than the universal planning grid.

2. The method of claim 1, wherein the UPG and the levels smaller in scale than the universal planning grid comprise a plurality of nested levels, the plurality of nested levels separated into core/shell levels including level 1A and level 1B, and the plurality of levels also organized into residential infill levels including level 2A and level 2B.

3. The method of claim 2, wherein level 1A defines the core/shell components including one or more of: risers, stair shafts, elevator shafts, trash stacks and electrical rooms while level 2A defines the residential infill frameworks.

4. The method of claim 2, wherein level 1B defines core/shell vertical infrastructure including mechanical, electrical and plumbing service distribution, while level 2B defines the residential infill components including one or more of kitchens, bathrooms, closets, and heating, ventilation and air conditioning (HVAC) closets.

5. The method of claim 2, wherein nested levels coordinate stacking of structure, core elements and building services in the MFRB.

6. A system for designing and building a multi-family residence building (MFRB), comprising:

one or more processors having a tangible computer-readable medium with computer executable instructions therein for executing a process comprising:

providing, via the one or more processors, a design platform comprising a database and design platform tools stored on the tangible computer-readable medium that manage a plurality of levels defining a nested design framework;

defining, via the one or more processors, a first level of the plurality of levels as a universal planning grid (UPG) that specifies dimensional standards and locational roles and coordinates nesting of at least some of the plurality of levels smaller in scale than the universal planning grid within dimensions designated by the universal planning grid, wherein the universal planning grid guides volume scale of the MFRB;

scaling, via the one or more processors, at least some of the plurality of levels to nest into at least one of the plurality of levels larger in scale than at least some of the plurality of levels;

applying, via the one or more processors, structural elements and major core components to a respective level of the plurality of levels, wherein the structural elements and the major core components are pre-coordinated to at least one additional level of the plurality of levels once the structural elements and the major core components are applied to the respective level of the plurality of levels;

identifying, via the one or more processors, at least one zone of standardization and at least one zone of adaptability for each of the plurality of levels, each of the at least one zone of standardization defining at least some of the structural elements aligned to an intersection of grid lines on two axes and defined by a common circulation corridor, each of the at least one zone of adaptability defining at least some of the structural elements aligned to one of the grid lines on the two axes parallel to the common circulation corridor;

defining and enforcing, via the one or more processors, rules to guide interfaces between the universal planning grid and at least some of the plurality of levels smaller in scale than the universal planning grid, the rules including mapping residential infill frameworks to desired locations without modification and coordinating core/shell components and the residential infill frameworks to minimize conflicts; and outputting, via an output component, building schematics of the MFRB that reflect the enforced rules and pre-coordinated relationships;

wherein the MFRB is constructed according to the building schematics;

further wherein at least one of: the universal planning grid and design catalogs of a platform toolkit stored on a computer-readable medium are updated at regular intervals based on design improvements from specific stages via the one or more processors, further wherein the updating at regular intervals are based on design improvements from specific stages within the designing of the MFRB, the specific stages including at least one of: the defining of the first level of the plurality of levels as the universal planning grid, the scaling of at least some of the plurality of levels, the applying of the structural elements and the major core components to a respective level of the plurality of levels, the identifying of the at least one zone of standardization and the at least one zone of adaptability for each of the plurality of levels, and the defining of the rules to guide the interfaces between the universal planning grid and at least some of the plurality of levels smaller in scale than the universal planning grid.

7. The system of claim 6, wherein the UPG and the levels smaller in scale than the universal planning grid comprise a plurality of nested levels, the plurality of nested levels separated into core/shell levels including level 1A and level 1B, and the plurality of levels also organized into residential infill levels including level 2A and level 2B.

8. The system of claim 7, wherein level 1A defines the core/shell components including one or more of: risers, stair shafts, elevator shafts, trash stacks and electrical rooms while level 2A separates residential units scale infill.

9. The system of claim 7, wherein level 1B defines core/shell vertical infrastructure including mechanical, electrical and plumbing service distribution, while level 2B defines residential component-scale infill including one or more of kitchens, bathrooms, closets, and heating, ventilation and air conditioning (HVAC) closets.

10. The system of claim 7, wherein each level is at a different scale.

11. The system of claim 7, wherein nested levels coordinate stacking of structure, core elements and building services in the MFRB.

12. The system of claim 6, further comprising developing a design catalog comprising adaptable building elements in each level of the plurality of levels, including, at the first level, standardized predetermined locations for structural and MEP services serving shell and infill levels.

* * * * *